(12) United States Patent
Kishi et al.

(10) Patent No.: US 10,978,691 B2
(45) Date of Patent: Apr. 13, 2021

(54) ELECTRODE GROUP, SECONDARY BATTERY, BATTERY PACK, AND VEHICLE

(71) Applicant: KABUSHIKI KAISHA TOSHIBA, Minato-ku (JP)

(72) Inventors: Takashi Kishi, Yokosuka (JP); Kazuomi Yoshima, Yokohama (JP); Tomoko Sugizaki, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 228 days.

(21) Appl. No.: 15/914,524

(22) Filed: Mar. 7, 2018

(65) Prior Publication Data

US 2019/0088928 A1 Mar. 21, 2019

(30) Foreign Application Priority Data

Sep. 21, 2017 (JP) .............................. JP2017-180801

(51) Int. Cl.
*H01M 4/00* (2006.01)
*H01M 4/131* (2010.01)
(Continued)

(52) U.S. Cl.
CPC ......... *H01M 4/131* (2013.01); *H01M 2/1646* (2013.01); *H01M 4/485* (2013.01); *H01M 4/525* (2013.01); *H01M 10/0525* (2013.01); *H01M 10/0585* (2013.01); *H01M 10/44* (2013.01); *H01M 4/364* (2013.01); *H01M 4/621* (2013.01); *H01M 10/0413* (2013.01);
(Continued)

(58) Field of Classification Search
CPC .... H01M 4/131; H01M 2/1646; H01M 4/525; H01M 4/485; H01M 10/0585; H01M 10/0525; H01M 10/44; H01M 10/0413; H01M 4/621; H01M 4/364; H01M 2004/028; H01M 2004/027; H01M 2220/20
See application file for complete search history.

(56) References Cited

U.S. PATENT DOCUMENTS 9,728,809 B2    8/2017  Inagaki et al.
2006/0051663 A1* 3/2006  Fujita ............... H01M 4/131
                                               429/142
(Continued)

FOREIGN PATENT DOCUMENTS

EP    2 793 286 A1   10/2014
JP    2010-244658    10/2010
(Continued)

*Primary Examiner* — Nicholas P D'Aniello
(74) *Attorney, Agent, or Firm* — Oblon, McClelland, Maier & Neustadt, L.L.P.

(57) ABSTRACT

According to one embodiment, there is provided an electrode group including an electrically insulating layer, a first electrode, and a second electrode. The second electrode is stacked in a first direction on the first electrode with the electrically insulating layer interposed therebetween. The first electrode includes plural first end portions in one or more second directions among directions orthogonal to the first direction. The plural first end portions are disposed at different positions in at least one of the second directions.

15 Claims, 13 Drawing Sheets

(51) Int. Cl.
  *H01M 10/44* (2006.01)
  *H01M 10/0525* (2010.01)
  *H01M 2/16* (2006.01)
  *H01M 10/0585* (2010.01)
  *H01M 4/525* (2010.01)
  *H01M 4/485* (2010.01)
  *H01M 4/02* (2006.01)
  *H01M 10/04* (2006.01)
  *H01M 4/62* (2006.01)
  *H01M 4/36* (2006.01)

(52) U.S. Cl.
  CPC ............... *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2007/0117008 A1 | 5/2007 | Kaneko et al. | |
| 2007/0231693 A1 | 10/2007 | Inagaki et al. | |
| 2012/0171550 A1 | 7/2012 | Inagaki et al. | |
| 2013/0224632 A1* | 8/2013 | Roumi | H01M 2/166 |
| | | | 429/516 |
| 2013/0295436 A1 | 11/2013 | Kwon et al. | |
| 2014/0038027 A1* | 2/2014 | Kanemoto | H01M 2/022 |
| | | | 429/146 |
| 2014/0099525 A1 | 4/2014 | Kwon et al. | |
| 2014/0186685 A1 | 7/2014 | Kwon et al. | |
| 2014/0205879 A1 | 7/2014 | Jang et al. | |
| 2016/0226067 A1 | 8/2016 | Harada et al. | |
| 2017/0271666 A1 | 9/2017 | Kishi et al. | |

FOREIGN PATENT DOCUMENTS

| | | |
|---|---|---|
| JP | 4557920 | 10/2010 |
| JP | 2011-100623 | 5/2011 |
| JP | 4782266 | 9/2011 |
| JP | 4920957 | 4/2012 |
| JP | 5017493 | 9/2012 |
| JP | 5552398 | 7/2014 |
| JP | 2014-199775 | 10/2014 |
| JP | 2015-069897 | 4/2015 |
| JP | 2015-76178 | 4/2015 |
| JP | 2015-526857 | 9/2015 |
| JP | 5779828 | 9/2015 |
| JP | 2016-1600 | 1/2016 |
| JP | 2016-072015 | 5/2016 |
| JP | 5956583 | 7/2016 |
| JP | 6058848 | 1/2017 |
| JP | 2017-168442 A | 9/2017 |
| WO | WO 2017/046915 A1 | 3/2017 |

* cited by examiner

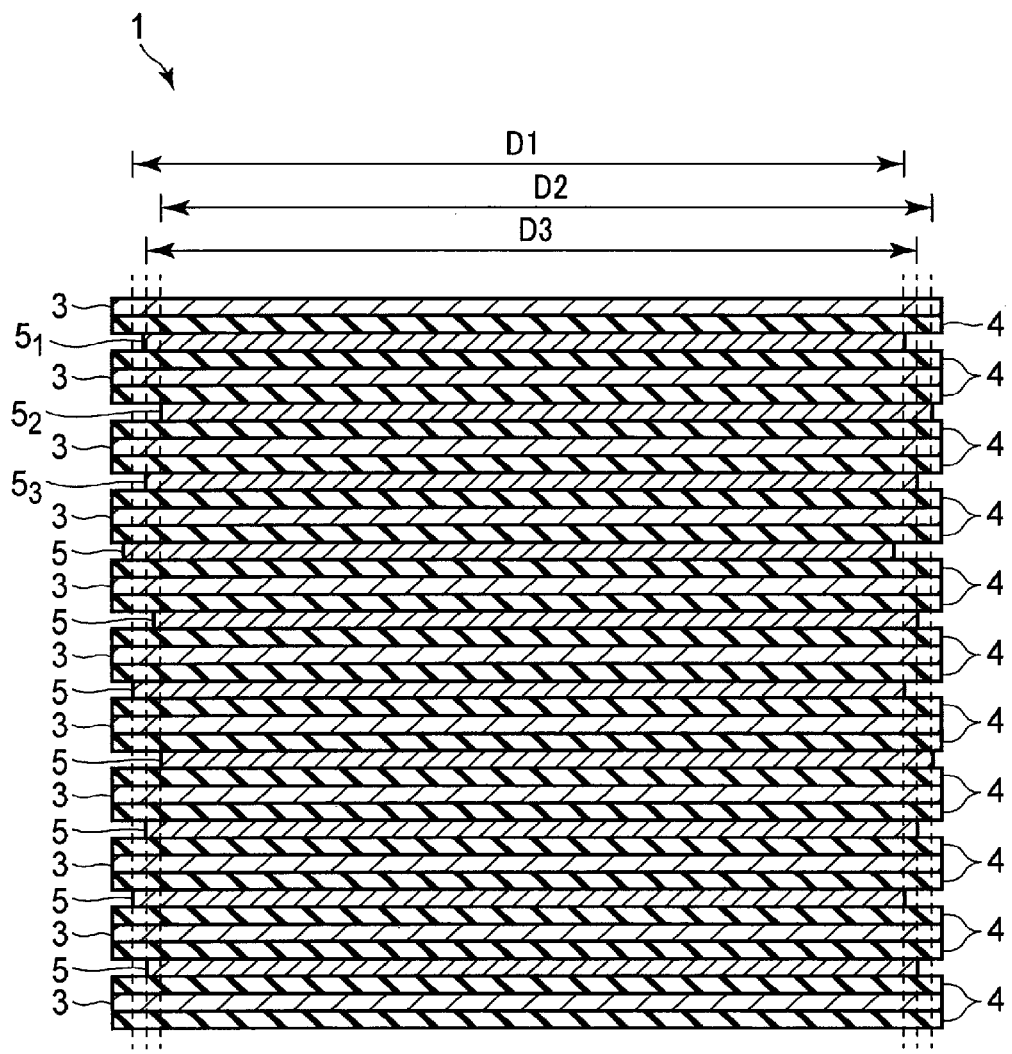
F I G. 2

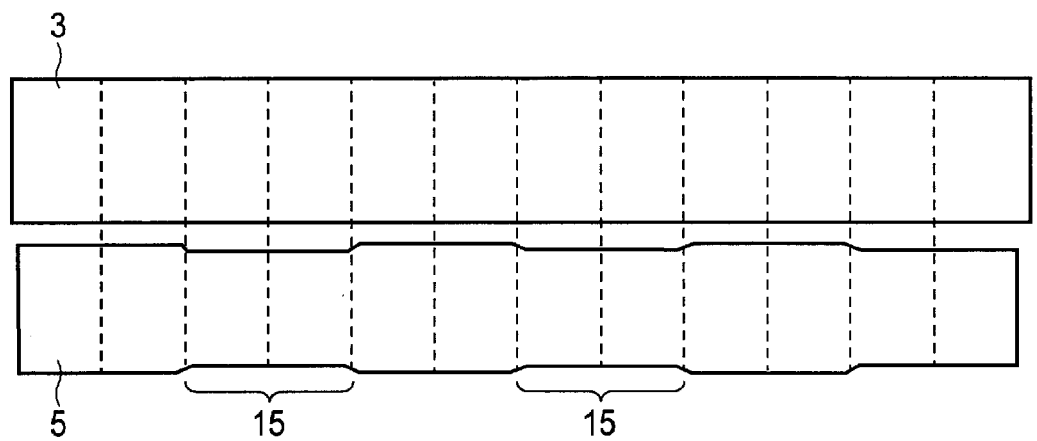
F I G. 8
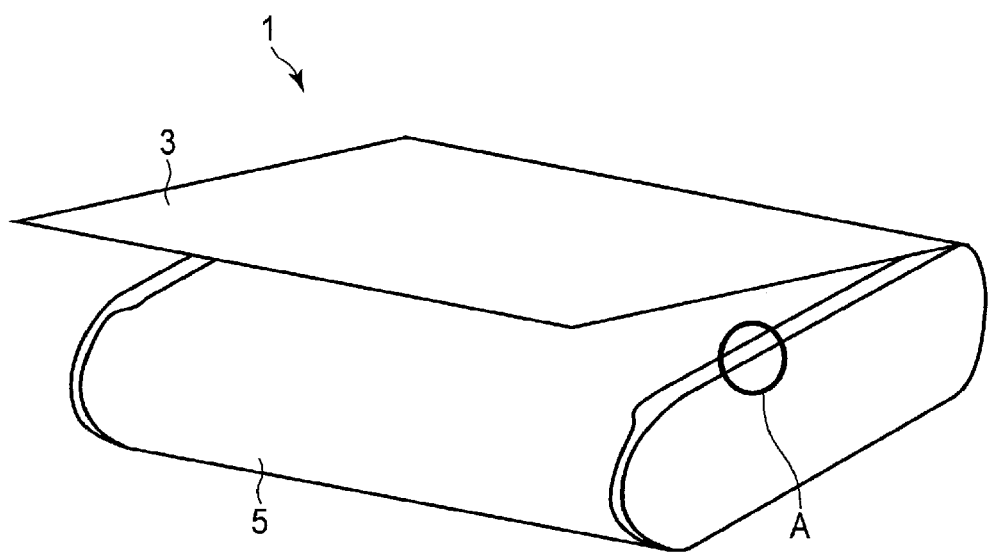
F I G. 9

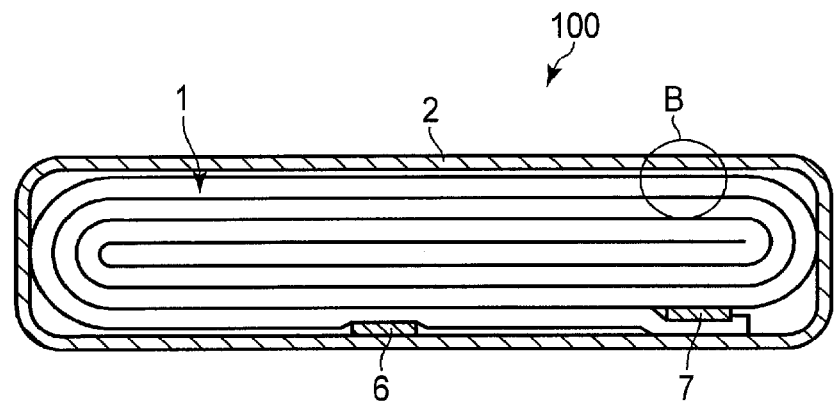
F I G. 12
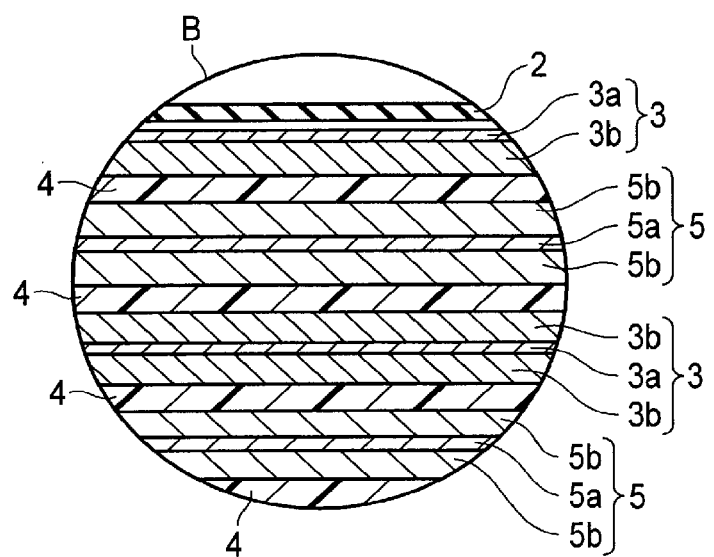
F I G. 13

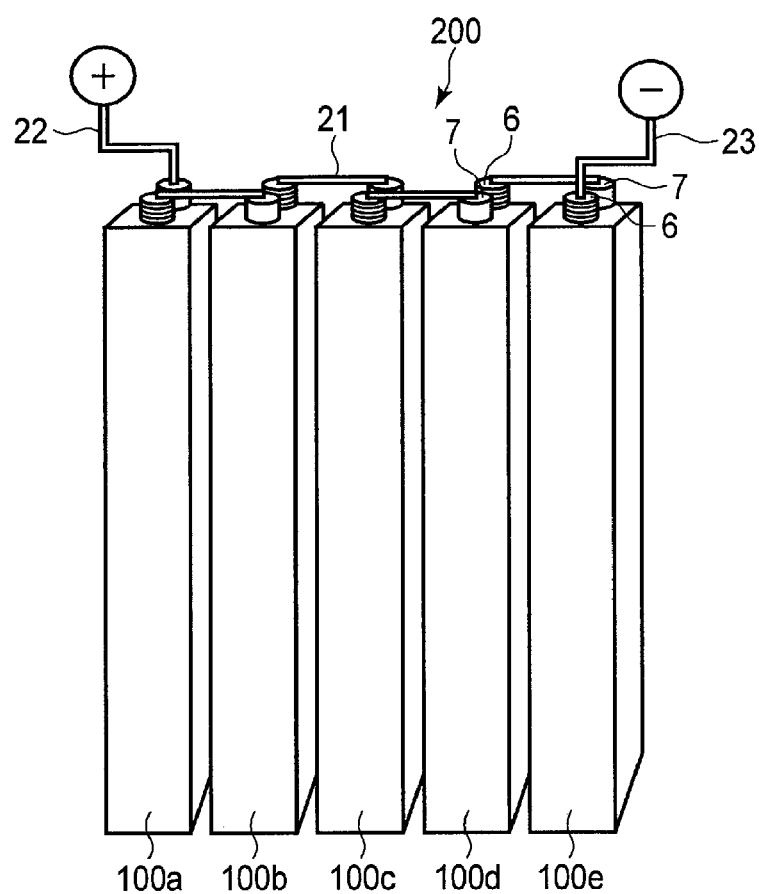
F I G. 14

ELECTRODE GROUP, SECONDARY BATTERY, BATTERY PACK, AND VEHICLE

CROSS-REFERENCE TO RELATED APPLICATION

This application is based upon and claims the benefit of priority from Japanese Patent Application No. 2017-180801, filed Sep. 21, 2017; the entire contents of which is incorporated herein by reference.

FIELD

Embodiments relate to an electrode group, a secondary battery, a battery pack, and a vehicle

BACKGROUND

Since secondary batteries can be repeatedly charged and discharged, the secondary batteries are useful for a reduction in waste, and are widely used as power supplies for portable devices which cannot be connected to an AC power supply, or for backup when the AC power supply is disconnected or stopped. In recent years, an expansion in the range of applications has been considered, examples being backup and power leveling applications, such as for an onboard application, for solar cells, and the like, and there are accordingly increasing demands for improvements in performance such as capacity, high temperature operation performance, and safety.

Among secondary batteries, nonaqueous electrolyte secondary batteries are secondary batteries that are charged and discharged by the migration of lithium ions between positive and negative electrodes. The nonaqueous electrolyte secondary battery utilizes an organic solvent as an electrolyte solution, and thus can provide a higher voltage than that of a nickel-cadmium secondary battery or a nickel-metal-hydride secondary battery that use an aqueous solution. Currently, transition metal oxides such as lithium-cobalt composite oxides and lithium-nickel composite oxides are used as positive electrode active materials for nonaqueous electrolyte secondary batteries in practical use. For example, carbon-based materials, titanium-containing oxides, and the like are used as negative electrode active materials. As electrolyte solutions, used are, for example, liquid nonaqueous electrolytes obtained by dissolving lithium salts such as $LiPF_6$ and $LiBF_4$ in organic solvents such as cyclic carbonates and linear carbonates. The above-mentioned positive electrode active materials have, with respect to a lithium metal potential, an average operating potential of from about 3.4 V to 3.8 V (vs. Li/Li$^+$) and reaches a maximum potential of from about 4.1 V to 4.3 V (vs. Li/Li$^+$) during charge. On the other hand, the operating potential range of the carbon-based material among the above-mentioned negative electrode active materials is from about 0.05 V to 0.5 V (vs. Li/Li$^+$) with respect to a lithium metal potential. The operating potential range is 1.55 V (vs. Li/Li$^+$) for lithium titanate ($Li_4Ti_5O_{12}$), which is a representative compound of the titanium-containing composite oxides as the negative electrode active materials. The combinations of these positive and negative electrode active materials achieve a battery voltage of 2.2 V to 3.8 V and a maximum charge voltage of from 2.7 V to 4.3 V.

The secondary battery including the negative electrode containing the titanium-containing composite oxide can be improved in a charge-and-discharge cycle life, output performance, and safety, and has been put into practical use.

Various titanium-containing composite oxides have been proposed, but there are many reports of spinel-type lithium titanate (for example, $Li_4Ti_5O_{12}$, abbreviated as LTO). The spinel-type lithium titanate is already being used for commercial products. As an example of the spinel-type lithium titanate, $Li_4Ti_5O_{12}$ reaches a minimum potential of from 1.0 V to 1.45 V (vs. Li/Li$^+$) with respect to a lithium metal potential during charge, and reaches a maximum potential of from 1.6 V to 2.0 V (vs. Li/Li$^+$) during discharge. On the other hand, monoclinic titanium dioxide ($TiO_2$, commonly known as $TiO_2$ (B)), niobium titanium composite oxide (for example, monoclinic $Nb_2TiO_7$ and orthorhombic niobium titanium composite oxide), and the like are available, and can provide a larger capacity than that of the spinel type lithium titanate. The monoclinic titanium dioxide reaches a minimum potential of from 0.9 V to 1.45 V (vs. Li/Li$^+$) with respect to a lithium metal potential during charge, and reaches a maximum potential of from 1.6 V to 2.5 V (vs. Li/Li$^+$) during discharge. As an example of the niobium titanium composite oxide, the monoclinic $Nb_2TiO_7$ reaches a minimum potential of 0.6 V to 1.40 V (vs. Li/Li$^+$) with respect to a lithium metal potential during charge and reaches a maximum potential of from 1.8 V to 3.0 V (vs. Li/Li$^+$) during discharge.

When the positive electrode and the negative electrode that have such structures are brought into electrical contact with each other, a short circuit occurs. Therefore, in order to prevent contact between the positive and negative electrodes, a separator made of a material having electrical insulation properties, and having, for example, a sheet shape can be used. On the other hand, measures are being taken, in which a layer containing insulating particles made of various solid electrolytes, alumina, and the like is provided on the surfaces of the positive and negative electrodes, thereby having the layer play the same role as that of the separator.

BRIEF DESCRIPTION OF THE DRAWINGS

FIG. 2 is a cross-sectional view schematically showing an example of one aspect of an electrode group according to an embodiment;

FIG. 8 is a plan view schematically showing an electrode that can be included in an example of another aspect of an electrode group according to an embodiment;

FIG. 9 is a perspective view schematically showing an example of the other aspect of an electrode group according to an embodiment;

FIG. 12 is a perspective view schematically showing another example of a secondary battery according to the embodiment;

FIG. 13 is an enlarged cross-sectional view of section B shown in FIG. 12;

FIG. 14 is a perspective view schematically showing an example of a battery module according to an embodiment;

DETAILED DESCRIPTION

Figure 1:
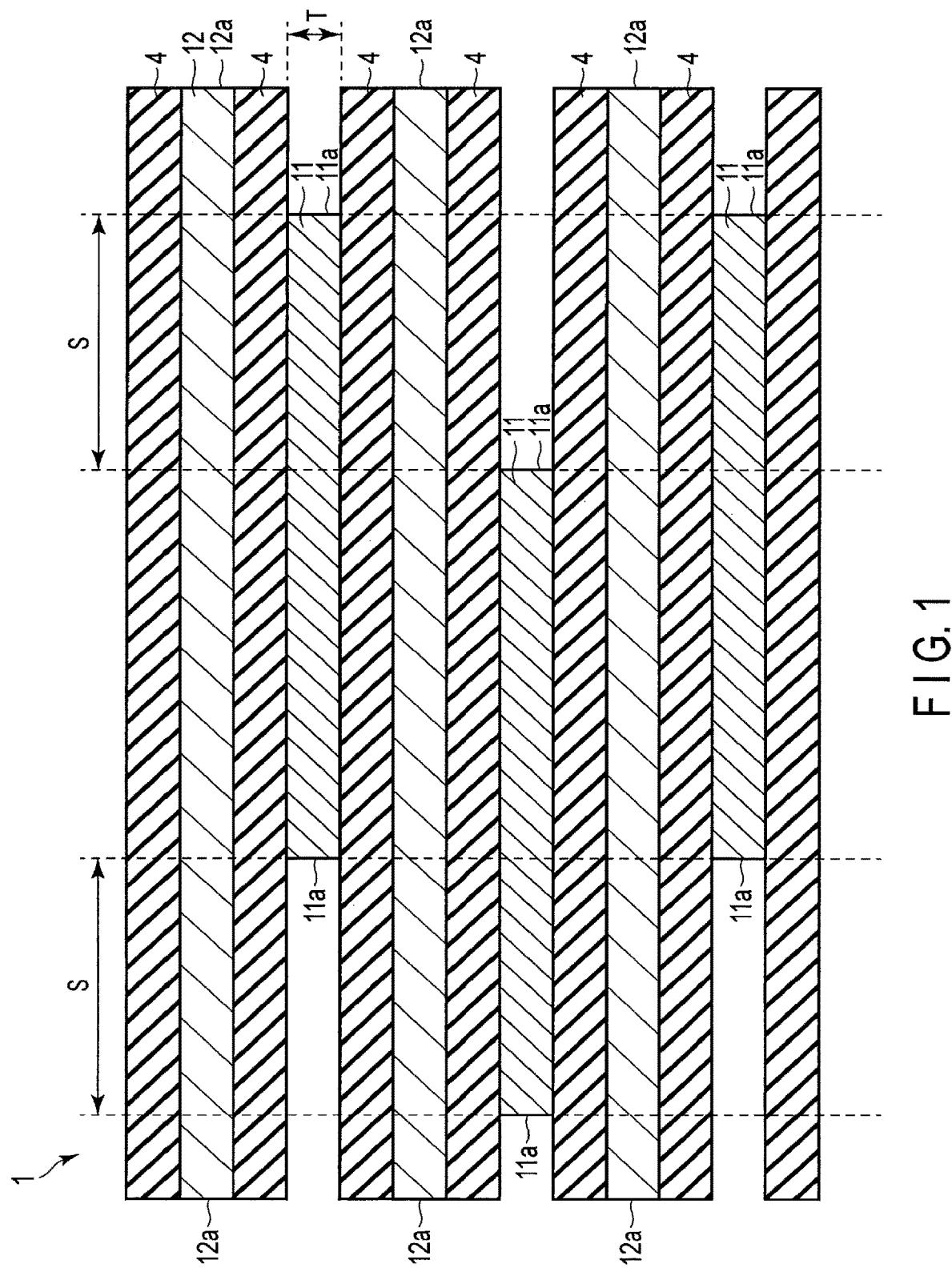
FIG. 1 is a schematic cross-sectional view showing an example of an electrode group according to an embodiment.

According to one embodiment, there is provided an electrode group including an electrically insulating layer, a first electrode, and a second electrode. The second electrode is stacked in a first direction on the first electrode with the electrically insulating layer interposed therebetween. The first electrode includes plural first end portions in one or more second directions among directions orthogonal to the first direction. The plural first end portions are disposed at different positions in at least one of the second directions.

According to another embodiment, there is provided a secondary battery including an electrode group and a container member. The electrode group is the electrode group according to the above embodiment. The container member houses the electrode group.

According to yet another embodiment, there is provided a battery pack including the above secondary battery.

According to still another embodiment, there is provided a vehicle including the battery pack according to the above embodiment.

Being performed are configuring of secondary batteries by stacking positive and negative electrodes each having a surface on which a layer containing insulating particles is provided. Such a configuration may cause non-uniform thickness of the insulating particle-containing layer that electrically distinguishes the positive and negative electrodes from each other, unlike a conventional configuration using a separator. There also is concern that the film strength of the insulating particle-containing layer is low. Therefore, there is danger of mechanical vibration and a pressure to a secondary battery causing short-circuiting, which cause a decrease in capacity or cause heat generation.

Hereinafter, embodiments will be described with reference to the drawings.

First Embodiment

An electrode group according to a first embodiment includes an electrically insulating layer, a first electrode, and a second electrode. The second electrode is stacked in a first direction on the first electrode with the electrically insulating layer interposed therebetween. The first electrode includes plural first ends in one or more second directions among directions orthogonal to the first direction. The plural first ends are disposed at different positions in at least one of the second directions.

In a secondary battery using a layer containing solid electrolyte particles and other electrically insulating particles (hereinafter referred to as an electrically insulating layer) as means for electrically distinguishing the first electrode and the second electrode (for example, a positive electrode and a negative electrode) from each other, configured is an electrode assembly as a minimum unit of an electrode structure, in which the electrically insulating layer is disposed between the first electrode and the second electrode. In order to increase the capacity of a secondary battery, it is possible to use an electrode group having a structure in which positive electrodes, electrically insulating layers, and negative electrodes are stacked in multiples.

In such an electrode group, forces such as stress concentrate at the end(s) of the electrode due to a pressure applied from outside the secondary battery or the expansion of the electrode group, which may cause a short circuit. In the electrode group, at a portion where the ends of the first electrode and the ends of the second electrode are multiply stacked with the electrically insulating layer interposed therebetween, forces such as stress due to an external pressure cannot be diverted, whereby a force exceeding the mechanical strength of the electrically insulating layer may be applied to the portion. As a result, the electrically insulating layer becomes broken, whereby the function of distinguishing the first electrode and the second electrode from each other by the electrically insulating layer is impaired, which is apt to cause a short circuit.

In the electrode group according to the embodiment, the above-described configuration suppresses the short circuit at the end positions of the electrodes. Specifically, plural first end portions included in the first electrode are disposed at different positions in one or more second directions, whereby the concentration of force to one position in the electrode group is alleviated. Thus, the breakage of the electrically insulating layer is suppressed, and the short circuit between the first electrode and the second electrode is suppressed.

An example of an electrode group according to a first embodiment is schematically shown in FIG. 1.

FIG. 1 is a schematic sectional view showing an example of an electrode group according to an embodiment. An electrode group 1 includes plural first electrodes 11, plural second electrodes 12, and plural electrically insulating layers 4. The plural first electrodes and the plural second electrodes are alternately stacked in respective thickness directions. Each of the electrically insulating layers 4 is interposed between the first electrode and the second electrode. One electrically insulating layer 4 is provided at each of both ends in a stacking direction. In other words, the electrode group 1 includes plural electrode assemblies each in which the first electrode and the second electrode are stacked with the electrically insulating layer 4 sandwiched therebetween. Electrically insulating layers 4 are further disposed between the plural electrode assemblies. FIG. 1 is a cross-sectional view taken along the stacking direction of the first electrode 11, the second electrode 12, and the electrically insulating layer 4.

In the description herein, a first direction refers to a direction parallel to the stacking direction. In other words, the first direction is parallel to the thickness direction of the first electrode 11, the thickness direction of the second electrode 12, and the thickness direction of the electrically insulating layer 4. A second direction herein refers to a direction parallel to the width directions of the first electrode 11 and the second electrode 12, among directions orthogonal to the first direction. That is, a longitudinal direction (vertical direction) in FIG. 1 corresponds to the first direction, and a traverse direction (horizontal direction) in FIG. 1 corresponds to the second direction.

In the electrode group 1 of the example shown in FIG. 1, for the illustrated three second electrodes 12, the positions of the ends in the second direction (hereinafter, second end portions 12a) are aligned. On the other hand, one first electrode 11 located in the middle in the first direction, among the illustrated three first electrodes 11 is displaced in the second direction, whereby the positions of the ends of the first electrodes 11 in the second direction (hereinafter, the first end portions 11a) are not aligned. Furthermore, none of the positions of any of the first end portions 11a in the second direction is aligned with the position of any of the second end portions 12a in the second direction.

Thus, the electrode group 1 includes the first electrodes 11 in which the positions of the first end portions 11a in the second direction are different from each other. That is, in the electrode group 1, the first end portions 11a are avoided from stacking multiply at any position in the second direction. Therefore, force is less likely to concentrate at the position of the first end portions, and thus, a short circuit between the first electrode and the second electrode is less likely to occur.

In the electrode group 1 of the example shown in FIG. 1, the positions of the second ends of the second electrodes in the second direction are aligned. The electrode group according to the embodiment is not limited to such an aspect, and includes, for example, an aspect in which the positions of the second ends in the second direction are different from each other. That is, the electrode group according to the embodiment includes an aspect in which the plural first end portions of the first electrodes are disposed at different positions in the second direction, while the plural second end portions of the second electrodes are disposed at different positions in the second direction.

In the electrode group 1, the degree of difference in positions of one first end portion 11a and another first end portion 11a in the second direction, that is, the displacement width S of the positions of the first end portions 11a in the second direction is desirably 5×T or more of the thickness T of the first electrode 11. The unit of the thickness T may be, for example, millimeter (mm). The thickness T may correspond to a distance occupied by the first electrode 11 in the first direction in the electrode group 1. Among the plural first end portions 11a, when the displacement width S of two adjacent first end portions 11a in the first direction is 5×T or more, a short circuit suppressing effect can be more reliably exhibited.

From the viewpoint of securing the battery capacity, the displacement width S is desirably 50×T or less. As the displacement width S increases, an area where the positive and negative electrodes face each other decreases, whereby the battery capacity decreases. Larger displacement provides less improvement in the short circuit suppressing effect, and less trade-off with respect to the battery capacity. In the actual production processes, the size and width of the electrode that can be controlled are limited, regardless of the thickness of the electrode. Therefore, the displacement width S is desirably from 0.5 mm to 5 mm. The displacement width S within this range makes it possible to provide a sufficient short circuit suppressing effect even if variations occur during production.

The thickness T and the displacement width S of the electrode (for example, the first electrode or the second electrode) in the electrode group included in the battery can be examined, for example, as follows.

The battery is disassembled in a glove box filled with argon, and the electrode group is taken out. As will be described later, the electrode group may contain a liquid or gel nonaqueous electrolyte. In this case, the nonaqueous electrolyte maybe removed by washing the electrode group, followed by vacuum drying. Subsequently, in the glove box, the thickness of the electrode group is measured in a state where a constant load (for example, 10 g/cm$^2$) is applied using a flat plate in the stacking direction of the electrode group (for example, the first direction). In a state where the flat plate is placed on the electrode group, the electrode group is cut in parallel at positions corresponding to 10%, 50%, and 90% of the thickness of the electrode group from the surface of the electrode group in contact with the flat plate, for example, along planes orthogonal to the first direction at the respective positions. As a result, electrode group samples divided into four in the direction orthogonal to the thickness of the electrode group are obtained. Each of the four electrode group samples is cut along four or more radial cut lines passing through a center in an in-plane direction. Angles between the cut lines intersecting at the center are made as even as possible. For each of the four electrode group samples, in the cross section cut along the radial cut line from the center in the in-plane direction, an end opposite to the end portion at the center position before cutting, that is, an end portion corresponding to the peripheral position before cutting is observed with a scanning electron microscope (SEM). A SEM observation magnification may be appropriately adjusted according to the electrode size, and is, for example, from 100 times to 1000 times. In each observed field of view, the thickness T of each electrode is measured. In each field of view, the positional relationship of the end portion of each electrode is examined, and the displacement width S is measured.

The electrode group may be, for example, an electrode group for a battery, including a primary battery and a secondary battery.

Examples of the form of the electrode group include a form in which plural electrode assemblies are stacked by stacking plural first electrodes, plural electrically insulating layers, and plural second electrodes in order of the first electrode, the electrically insulating layer, the second electrode, and electrically insulating layer. There is also a form where, for example, a band-shaped electrode stack in which one first electrode, two electrically insulating layers, and one second electrode are stacked in order of the first electrode, the electrically insulating layer, the second electrode, and the electrically insulating layer is wound, whereby the first electrode, the electrically insulating layer, and the second electrode become stacked in multiple. In addition, for example, the electrode group may be in a form in which a band-shaped electrode stack is folded in zigzag.

The first electrode may be either a positive electrode or a negative electrode. The second electrode may be the other, of the positive electrode and the negative electrode. That is, in one example of the electrode group, the first electrode may be a positive electrode, the second electrode being a negative electrode. In another example of the electrode group, the first electrode may be a negative electrode, the second electrode being a positive electrode.

The electrode group may include a bipolar electrode. The bipolar electrode may have a structure obtained by, for example, forming a positive electrode material layer (for example, a positive electrode active material-containing layer described later) on one surface of one electrode current collector, and forming a negative electrode material layer (for example, a negative electrode active material-containing layer described later) on the other surface of the electrode current collector located on the rear side. In the case of including the bipolar electrode, the positive electrode material layer may be regarded as a first electrode, the negative electrode material layer being regarded as a second electrode. Alternatively, the negative electrode material layer may be regarded as a first electrode, the positive electrode material layer being regarded as a second electrode.

As a specific example of the form that the electrode group according to the first embodiment can take, an example of a stacked electrode group will be described.

When a stacked electrode group is formed by stacking plural electrode stacks each including an electrically insulating layer, a first electrode, and a second electrode, for example, the plural electrically insulating layers, first electrodes, and second electrodes may be stacked such that the first electrodes are displaced with respect to each other. The stacking direction is defined as a first direction, and a direction included in a plane orthogonal to the first direction is defined as a second direction. The positions of the first ends of the first electrodes in the second direction can be made different between first electrodes by displacing the first electrodes from each other along at least one of the second directions extending in 360 degrees.

Alternatively, plural first electrodes having different dimensions in at least one direction can be used as the first electrode. By using the plural first electrodes having different dimensions along at least one second direction, the positions of the first ends of the first electrodes in the second direction can be made different between first electrodes.

The above-described displacement width S among the plural first electrodes displaced in the second direction may correspond to the displaced distance. The displacement width S in the second direction among the plural first electrodes having different dimensions in the second direction may correspond to a difference between dimensions in the second direction.

The positions of the plural first ends may be different from each other, one-dimensionally, that is, in one direction among the second directions in 360 degrees orthogonal to the first direction, or in two directions having a relationship of 180 degrees. Alternatively, the positions of the plural first ends may be different from each other, two-dimensionally, that is, in two directions having a relationship of less than 180 degrees among the second directions, or in three or more directions.

Next, an example of the stacked electrode group that is one aspect of the electrode group according to the first embodiment will be described with reference to the drawings.

FIG. 2 is a cross-sectional view schematically showing an example of a stacked aspect of an electrode group according to an embodiment. A stacked electrode group 1 shown in FIG. 2 includes plural electrically insulating layers 4, plural positive electrodes 5 as first electrodes, and plural negative electrodes 3 as second electrodes. Moreover, included is a structure where repeatedly stacked further are electrode stacks, each of which have the electrically insulating layer 4, the negative electrode 3, the electrically insulating layer 4, and the positive electrode 5 stacked in this order. That is, the stacked electrode group 1 has a stacked electrode structure in which plural electrode stacks each including the electrically insulating layer 4, the first electrode (positive electrode 5), and the second electrode (negative electrode 3) are stacked.

Upon describing the electrode group 1 in FIG. 2, the first direction refers to a direction parallel to the stacking direction of the plural electrode stacks. FIG. 2 is a cross-sectional view taken along the first direction of the electrode group 1.

In the description herein, the second direction refers to a direction parallel to the width direction of the positive electrode 5 and the negative electrode 3, among directions orthogonal to the first direction. That is, the longitudinal direction (vertical direction) in FIG. 2 corresponds to the first direction, and the traverse direction (horizontal direction) in FIG. 2 corresponds to the second direction.

In the electrode group 1 shown in FIG. 2, the positions of the ends (second ends) of the plural negative electrodes 3 (second electrodes) in the second direction in the electrode group 1 are aligned. On the other hand, the positions of the ends (first ends) of the plural positive electrodes 5 (first electrodes) in the second direction are partially different from each other, and are not aligned. That is, the positive electrodes 5 as the first electrode include positive electrodes 5 having first ends located at different positions in the second direction. In other words, in the electrode group 1 shown in FIG. 2, the positions of the first ends of the plural positive electrodes 5 (first electrodes) have a positional relationship of being partially displaced from each other.

Specifically, the positive electrodes 5 do not include any pair of the positive electrodes 5 in which the positions in the second direction are aligned for two first ends that are adjacent in the first direction, among the plural first ends. That is, the first end of the positive electrode 5 included in one electrode stack of the electrode stacks multiply stacked in the stacked electrode structure and the first end of the positive electrode 5 included in the next electrode stack are not located at the same position in the second direction.

In the stacked electrode structure having such a structure, there are no sections at any position in the second direction where the positive electrode 5 and the negative electrode 3 continuously face each other. Therefore, even when force is externally applied to the electrode group 1 or when the electrode group 1 expands, force does not concentrate very much at any of the first ends, and thus, there is less likelihood of occurrence of a short circuit between the positive electrode 5 and the negative electrode 3.

Some of the plural positive electrodes 5 may have the same length in the second direction. For example, in FIG. 2, among the plural positive electrodes 5, the length D2 in the traverse direction for the second positive electrode $5_2$ illustrated from the top of the figure and the length D3 in the traverse direction for the third positive electrode $5_3$ have the same value. Some parts of the other plural positive electrodes 5 have different lengths in the second direction. For example, in FIG. 2, among the plural positive electrodes 5, the length D1 in the traverse direction for the first positive electrode $5_1$ illustrated from the top in the drawing, and the length D2 in the traverse direction for the second positive electrode $5_2$ are different from each other. All the lengths in the second direction for the plural positive electrodes 5 may be different from each other, or all the lengths in the second direction thereof may be the same.

Figure 3:
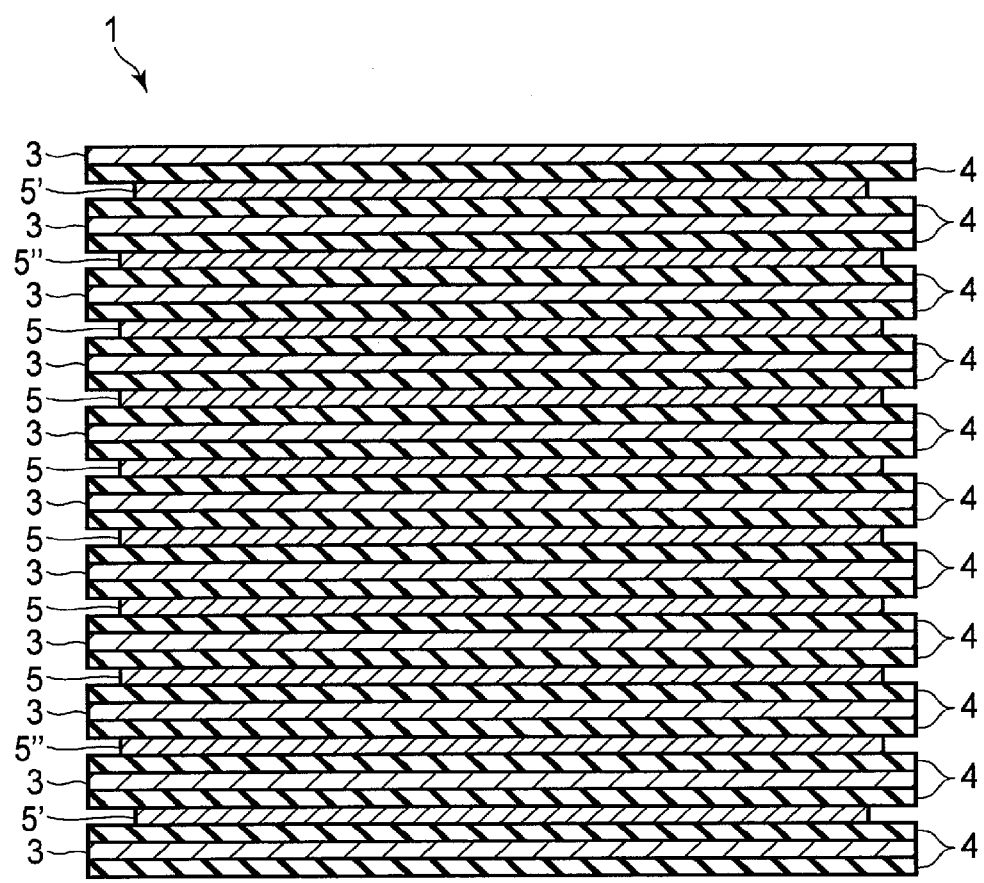
FIG. 3 is a cross-sectional view schematically showing another example of the one aspect of an electrode group according to an embodiment.

FIG. 3 is a cross-sectional view schematically showing another example of a stacked aspect of an electrode group according to an embodiment. As with FIG. 2, the stacked electrode group 1 shown in FIG. 3 includes a stacked electrode structure in which plural electrode stacks each including an electrically insulating layer 4, a first electrode (positive electrode 5), and a second electrode (negative electrode 3) are stacked.

As with FIG. 2, FIG. 3 is a cross-sectional view taken along a first direction that is a direction parallel to the stacking direction of the plural electrode stacks. Also, in the description of FIG. 3, the second direction refers to a direction parallel to the width direction of the positive electrodes 5 and the negative electrodes 3, among directions orthogonal to the first direction.

In the electrode group 1 shown in FIG. 3, among plural first end portions of the positive electrodes 5 in the stacked electrode structure, the positions in the second direction of the two first end portions located at both farthest ends in the first direction are different from the position in the second direction of other first end portion adjacent in the first direction relative to these two first end portions. That is, among the plural electrode stacks that are repeatedly stacked to configure the stacked electrode structure, the position in the second direction for the first end portion of a positive electrode 5' included in the outermost electrode stack in the stacking direction is different from that of a positive electrode 5" of an electrode stack located one inside. The positions in the second direction are aligned for the first end portions of the other positive electrodes 5 and positive electrodes 5", aside from the two positive electrodes 5' provided at both the ends of the electrode group 1 in the stacking direction.

Among the plural positive electrodes 5 included in the electrode group 1, force is apt to concentrate at the first end portion of the positive electrodes 5 disposed on the outermost side thereof. That is, among the plural positive electrodes 5 included in the electrode group 1, risk of short circuit occurring is high at the positions of the first end portions of the positive electrodes 5' disposed on the outermost side thereof. This risk can be avoided by displacing the position of the first end portion in the second direction for the outermost positive electrode 5' relative the position in the second direction of the first end portion for the next positive electrode 5".

From the viewpoint of securing the battery capacity, it is desirable to increase an area where the positive electrode(s) 5 and the negative electrode(s) 3 face each other, that is, to increase an area where the first electrode(s) and the second electrode(s) face each other. In order to increase the area where the first electrode(s) and the second electrode(s) face each other, not only for the second end portions of the second electrode(s) but also the positions for first end portions of first electrode(s) as with the electrode group 1 of FIG. 3 may be aligned in the second direction.

In the electrode group 1 in FIG. 3, the positions in the second direction of the first end portions of the first electrodes at both ends in the stacking direction (first direction) of the electrically insulating layer 4, the first electrode (positive electrode 5), and the second electrode (negative electrode 3) is different from the positions in the second direction of the first end portions of the first electrodes located inside by one stage, while the positions in the second direction are aligned for the first end portions other than the first end portions at both ends in the stacking direction. This configuration can secure the battery capacity while effectively preventing a short circuit that is apt to occur at the first end portions at both ends in the electrode group 1 of FIG. 3.

In the example of FIG. 3, among the plural first end portions, the positions in the second direction of both the two first end portions located at the farthest ends in the first direction are different from the positions of first end portions adjacent in the first direction. That is, the positions of the first end portions at both ends in the stacking direction are displaced. Even when the position in the second direction of only one of the two first end portions at the farthest ends in the first direction is made different from the position in the second direction of the first end portion adjacent in the first direction, the above effect can be obtained.

In the specific examples illustrated in FIGS. 2 and 3, the positive electrode 5 is regarded as a first electrode, and the negative electrode 3 is regarded as a second electrode. The electrode group according to the embodiment is not limited to such an aspect. Examples thereof include an aspect in which the negative electrode 3 is regarded as a first electrode and the positive electrode 5 is regarded as a second electrode. In the above example, the positions of the second ends of the second electrode (negative electrode 3) in the second direction are aligned. The electrode group according to the embodiment is not limited to such an aspect, and includes, for example, an aspect in which the positions of the second ends in the second direction are different from each other. That is, the electrode group according to the embodiment includes an aspect in which the plural first end portions of the first electrodes are disposed at different positions in the second direction, and the plural second end portions of the second electrodes are disposed at different positions in the second direction, simultaneously.

In a stacked electrode group in which rectangular electrodes are stacked, for example, as the first end(s) for one first electrode, the positions of only one side, two sides, three sides, or all four sides of a rectangular shape may be displaced from the positions of the first ends of the other first electrodes. Alternatively, taking the corner(s) of the rectangular shape as the first end(s), a short circuit suppressing effect may also be obtained by displacing the positions of one to four corners. The position(s) of the side(s) of the rectangular shape and the position(s) of the corner(s) may be simultaneously displaced, or only one or the other may be displaced. Among the entire circumference that may be the first end in the stacked electrode group of the rectangular electrode, the risk of short circuit occurring is remarkably high at the corner. Therefore, in the rectangular electrode, it is preferable that at least the corner is regarded as the first end portion, and the position thereof is displaced.

When the position(s) of only the corner(s) is displaced, for example, a cut can be provided at the corner of the target electrode. The cut can be provided, for example, by cutting off the corner along a diagonal or rounding the corner into a ¼ circle shape. In order to displace the positions of the corners as the first ends, for example, an electrode having no cut and an electrode having a cut may be used. Alternatively, the sizes of the cuts provided in the electrodes or the radii of circular arcs when rounded may be different. The size of the displacement when the position of the corner is displaced, that is, the above-mentioned displacement width S can be defined as follows, for example. In the following description, regarded as the position of the first end, is an intersection between the cut line and a straight line drawn from the corner as a start point at an angle of 45° from one side of the sides adjacent to the corner.

Specific examples of cut processing that can be performed on the corner of the rectangular electrode are shown in FIGS. 4 to 7. FIGS. 4 to 7 are schematic views each showing a processing example of a rectangular electrode.

Figure 4:
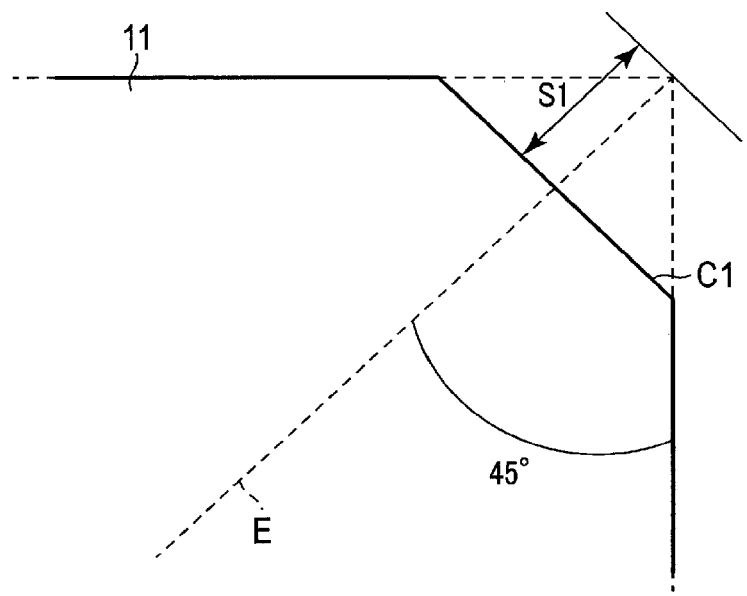
FIG. 4 is a schematic view of an example of processing of a rectangular electrode.

FIG. 4 shows an example in which a cut is provided by cutting off the corner of the rectangular electrode along a diagonal. In this example, the corner is cut along a cut line C1 orthogonal to a straight line E drawn at an angle of 45° relative to one side from the corner of the electrode before providing the cut as a start point. When a direction parallel to the straight line E drawn at an angle of 45° is taken as a second direction, a cross section taken along the cut line C1 corresponds to the first end of the first electrode 11. A distance S1, from the corner to the intersection between the straight line drawn at an angle of 45° and the cut line, corresponds to the displacement width S between the position of the first end of the first electrode 11 and the position of the first end of an electrode in which a cut is not provided.

Figure 5:
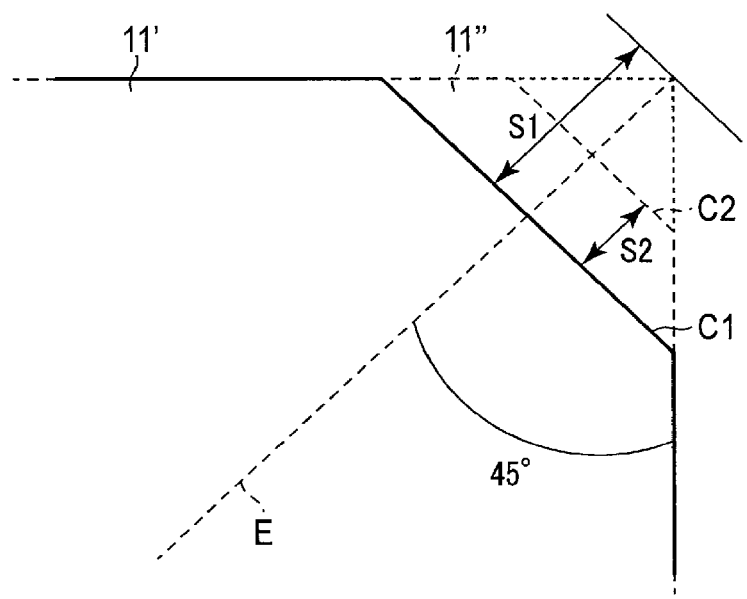
FIG. 5 is a schematic view of another example of processing of a rectangular electrode.

FIG. 5 shows another example in which a cut is provided by cutting off the corner of the rectangular electrode along a diagonal. Also in this example, the corner is cut along the cut line C1 orthogonal to the straight line E drawn at an angle of 45° relative to one side from the corner of the electrode before providing the cut as a start point. Taking the direction parallel to the straight line E drawn at an angle of 45° as the second direction, the cross section taken along the cut line C1 corresponds to the first end of the first electrode 11'. A distance S1, from the corner before providing the cut to the intersection between the straight line E drawn at an angle of 45° and the cut line, corresponds to the displacement width S between the position of the first end of the first electrode 11' and the position of the first end of the electrode in which a cut is not provided. FIG. 5 shows a distance S2 between two cut lines C1 and C2 when cuts are provided at different positions. This distance S2 may correspond to the displacement width S between the first ends of the first electrode 11' and the first electrode 11" having a cut size different from that of the first electrode 11'.

Figure 6:
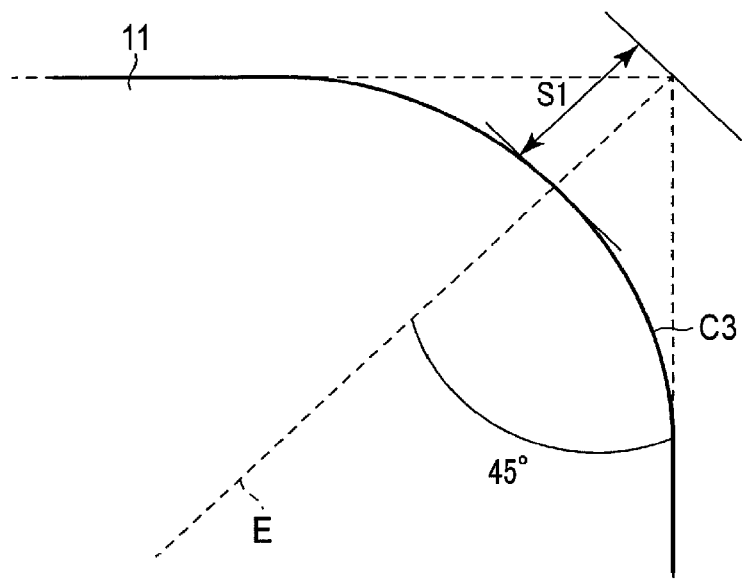
FIG. 6 is a schematic view of still another example of processing of a rectangular electrode.

FIG. 6 shows an example in which a cut is provided by cutting out a corner of a rectangular electrode in an arc shape. When taken as a second direction is a direction parallel to a straight line E drawn at an angle of 45° relative to one side from the corner of the electrode before providing the cut as a start point, the intersection of the straight line E drawn at an angle of 45° and the arc-shaped cut line C3 corresponds to the position of the first end of the first electrode 11 in the second direction. A distance S1, between the intersection and the corner before a cut is provided, may correspond to the displacement width S between the position of the first end of the first electrode 11 and the position of the first end of an electrode in which a cut is not provided.

Figure 7:
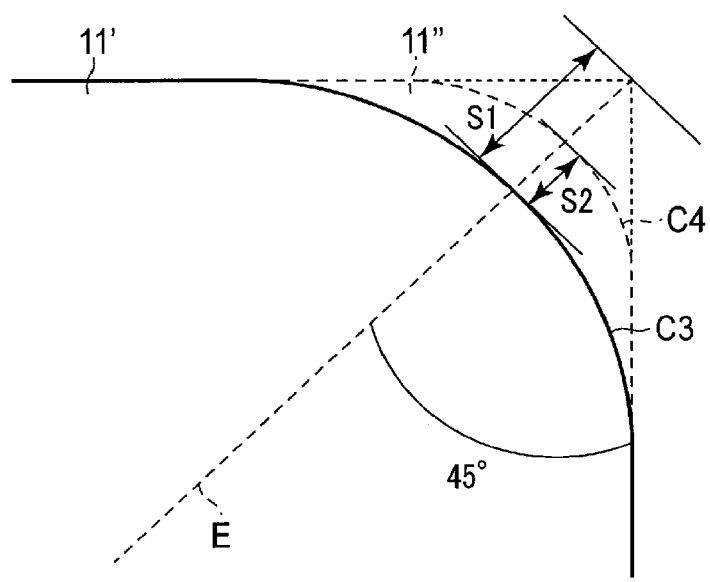
FIG. 7 is a schematic view of yet another example of processing of a rectangular electrode.

FIG. 7 shows another example in which a cut is provided by cutting out a corner of a rectangular electrode in an arc shape. Also in this example, when a direction parallel to a straight line E drawn at an angle of 45° is taken as a second direction, the intersection between the straight line drawn at an angle of 45° and the arc-shaped cut line C3 corresponds to the position of the first end of the first electrode 11'. A distance S1, between the intersection and the corner before a cut is provided, corresponds to the displacement width S between the position of the first end of the first electrode 11' and the position of the first end of an electrode in which a cut is not provided. FIG. 7 shows a distance S2 between cut lines C3 and C4 when cuts are provided at different positions. This distance S2 may correspond to the displacement width S between the first ends of the first electrode 11' and the first electrode 11" rounded to an arc having a radius different from that of the first electrode 11'.

In FIGS. 4 and 5, an example is shown, in which the cut is provided along the linear cut lines C1 and C2 orthogonal to the straight line E drawn at an angle of 45° with respect to the corner of the rectangular shape. In FIGS. 6 and 7, an example is shown, in which the cut is provided along the arc-shaped cut lines C3 and C4 each having a ¼ circle shape. The shape of the cut provided at the corner(s) of the rectangular electrode is not limited to these shapes. As long as the displacement width S described above is secured, cut processing providing various shapes may be performed.

In the electrode group 1 of FIG. 2, an example is shown, in which the positions of the first ends of the first electrodes are displaced in the one-dimensional second direction along the width direction of the positive electrode 5 as the first electrode. The positions of the two first ends at the start point and the end point in the second direction of each of the first electrodes are displaced from the positions of the two first ends of the other first electrodes. When the electrode group 1 in FIG. 2 is a stacked electrode in which rectangular electrodes are stacked, and FIG. 2 is taken as showing a cross section along a cut line parallel to any side of the rectangular shape, the two first ends at the start point and the end point in the second direction correspond to two sides orthogonal to the cross section among sides of each of the first electrodes. When FIG. 2 is taken as showing a cross section along a cut line connecting one corner and a corner opposed thereto in the rectangular shape, the two first ends at the start point and the end point in the second direction correspond to two corners among the corners of the first electrodes.

An example of a wound electrode group will be described as another example of a form that the electrode group according to the first embodiment may take.

When an electrode stack including an electrically insulating layer, a first electrode, and a second electrode is wound to configure a wound electrode group, the width of a band-shaped electrode used as the first electrode, for example, may be made different at certain parts. The width of the band-shaped electrode described here means a width in a direction parallel to a winding axis during winding, that is, a width in a short side direction. By winding the band-shaped electrode having widths in the short side direction being different at certain parts, there may be provided a wound electrode in which, regarding the direction parallel to the winding axis as a second direction, the positions in the second direction are different for the first ends, that is, edges along the long side direction of the band-shaped electrode. Specifically, by winding a band-shaped electrode having narrower widths at certain parts, there can be provided an electrode group in which a first end portion corresponding to a portion of narrower width is located at a position more inside the electrode group along the second direction, with respect to the first end portions of the other sections.

When the band-shaped electrode is provided with portions having different short-side widths, it is desirable that for the portions having different short-side widths, the lengths in the long-side direction correspond to one lap of winding in the wound electrode or more. Thereby, in the electrode group after winding, the short-side widths can be made different between one lap of the wound band-shaped electrode and the next lap. That is, between one lap and the next lap, the positions of the first ends in the second direction can be displaced.

Alternatively, the positions of the first end portions may be displaced also by using plural band-shaped electrodes having different short-side widths as the first electrode. Alternatively, even when the plural band-shaped electrodes have the same width, the electrodes may be arranged upon winding such that the edges along the long-side direction are displaced between the electrodes as the first electrode, whereby the position of the first end portions are displaced.

When the first electrode is a band-shaped electrode including portions having different short-side widths, the displacement width S in the second direction may correspond to a difference between the widths of the portions having different short-side widths. When plural band-shaped electrodes having different widths are used as the first electrode, the displacement width S in the second direction may correspond to a difference between the widths of the electrodes having different widths. When plural band-shaped electrodes having the same width are used as the first electrode and arranged so that the edges along the long-side direction are displaced between electrodes, the displacement width S in the second direction may correspond to a distance by which the edges along the long-side direction are displaced in the arrangement upon winding.

Next, an example of a wound electrode group that is one aspect of the electrode group according to the first embodiment will be described with reference to the drawings.

Figure 10:
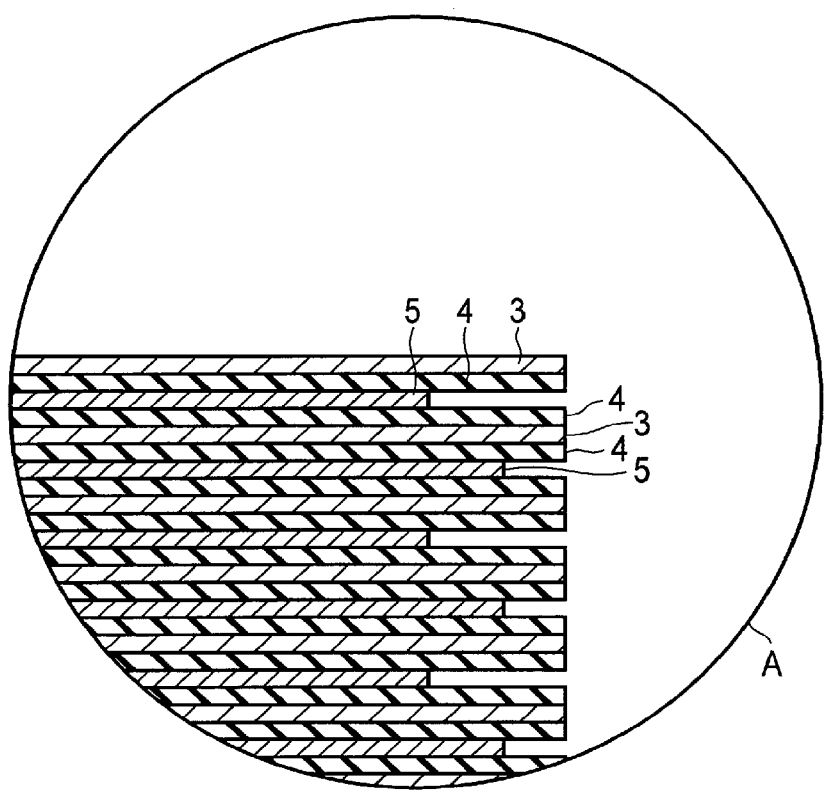
FIG. 10 is an enlarged cross-sectional view of section A shown in FIG. 9.

FIG. 8 is a plan view schematically showing an example of an electrode that may be included in a wound electrode group according to an embodiment. FIG. 9 is a perspective view schematically showing an electrode group of a wound aspect according to an embodiment. FIG. 10 is an enlarged schematic cross-sectional view of section A in FIG. 9.

FIG. 8 shows a positive electrode 5 as a first electrode and a negative electrode 3 as a second electrode. The positive electrode 5 is a band-shaped electrode including portions 15 at certain parts along a long-side direction where a width in a short-side direction is narrower. The negative electrode 3 is a band-shaped electrode having the same width in a short-side direction over the entire span in a long-side direction.

The electrode group 1 shown in FIG. 9 is a flat wound electrode group. The electrode group 1 includes a negative electrode 3, a positive electrode 5, and an electrically insulating layer (not shown). The negative electrode 3 and the positive electrode 5 are respectively the negative electrode 3 and the positive electrode 5 shown in FIG. 8. The electrode group 1 includes a wound electrode structure in which an electrode stack including an electrically insulating layer, a positive electrode 5 (first electrode), and a negative electrode 3 (second electrode) is wound. In the wound electrode structure, the positive electrode 5 and the negative electrode 3 are electrically distinguished by the electrically insulating layer.

While describing the flat type wound electrode group 1 shown in FIG. 9, the direction parallel to the winding axis is regarded as a second direction.

FIG. 10 shows a part of a cross section along one plane including the second direction of the wound electrode group 1 shown in FIG. 9. The traverse direction (horizontal direction) in FIG. 10 corresponds to the second direction.

As shown in FIG. 8, the positive electrode 5 includes portions 15 having a narrow width in a short-side direction. Furthermore, alternately arranged along a long-side direction of the positive electrode 5 are the portions 15 and portions having a width in a short-side direction that is not narrow. The short-side direction of the positive electrode 5 corresponds to the second direction in the electrode group 1. The lengths of each region in the long-side direction of the positive electrode 5 coincide with the circumferential length of a winding lap where the respective regions are located within the wound electrode group 1 of FIG. 9, for example. As a result, in the electrode group 1, the regions of the positive electrodes 5 in the long-side direction are stacked as plural laps. Among these laps, the short-side widths of the positive electrodes 5 are different between the two laps adjacent in the stacking direction. That is, as shown in FIG. 10, the positions of the first ends in the second direction are different between one lap of the positive electrode 5 and the next lap in the wound electrode structure. More specifically, since the positive electrode 5 as the first electrode includes regions having two different widths, the lap in which the first end portion in the second direction is at one of the two positions and the lap in which the first end portion is at the other of the two positions are alternately stacked.

In FIGS. 8 to 10, the example using the band-shaped electrode including two regions having different short-side widths along the long-side direction as the first electrode (positive electrode 5) is described. However, for example, an electrode including three or more regions having different short-side widths may be used as the first electrode, or two or more electrodes having different short-side widths may be used as the first electrode.

In the specific examples illustrated in FIGS. 8 to 10, the positive electrode 5 is regarded as the first electrode, and the negative electrode 3 is regarded as the second electrode. The electrode group according to the embodiment is not limited to such an aspect. Examples thereof include an aspect in which the negative electrode 3 is regarded as a first electrode and the positive electrode 5 is regarded as a second electrode. In the above example, the positions of the second end portions of the second electrode (negative electrode 3) in the second direction are aligned. The electrode group according to the embodiment is not limited to such an aspect, and includes, for example, an aspect in which the positions of the second end portions in the second direction are different from each other. That is, the electrode group according to the embodiment includes an aspect in which the plural first ends of the first electrodes are disposed at different positions in the second direction, and the plural second ends of the second electrodes are disposed at different positions in the second direction, simultaneously.

The electrode group according to the first embodiment may have a zigzag shape. For example, the electrode group having a zigzag shape may be an electrode group in which an electrode stack wound in a wound electrode group has been folded in zigzag in place of being wound.

The position(s) of the second end(s) in the second direction is desirably located at a position protruding toward the outside of the electrode group as compared with the position(s) of the first end(s) in the second direction. At the second end(s) protruding outward from the first end(s), the first electrode(s) does not overlap the second electrode(s). Therefore, even if force is applied from the exterior to the electrode group or the electrode group expands, force does not concentrate very much at the second end(s). Therefore, a short circuit is less likely to occur at the second end(s).

On the other hand, the end(s) of the electrode(s) that does not protrude toward the outside of the electrode group overlaps with the other electrode(s) as counter electrode, so that a force such as stress is not easily diverted. In particular, when the electrode group is used for a secondary battery having a rigid container member such as a metal can, for example, the electrode group may become pressed against the metal can when the electrode group expands. At this time, the stress concentrates at the edges of the electrode group, thus the risk of short-circuiting increases. With regard to the electrode(s) in which the end position(s) in the second direction does not protrude toward the outside of the electrode group as compared with the end position(s) of the counter electrode, the risk of the short circuit can be largely suppressed by displacing at least a part of plural end positions in the second direction from each other.

In a preferred embodiment of the electrode group according to the first embodiment, the length of the entire first electrode in the second direction is shorter than the length of the second electrode in the second direction. Due to the length relationship, the positions of the second ends of the second electrodes at both ends along the second direction can be set at positions protruding toward the outside of the electrode group with respect to the positions of the first ends of the first electrodes.

In the case of the stacked electrode group, for example, an electrode having a large area can be used as the second electrode. For example, by increasing the length of the rectangular electrode in one direction such as the longitudinal direction or the traverse direction, the length thereof in the second direction in one dimension can be increased. By increasing the lengths of the rectangular electrode in two, directions such as the longitudinal direction and the traverse direction, the length of the electrode in the second direction in two dimensions, that is, the length of the electrode in the second direction in all 360 degrees can be increased. From the opposite viewpoint, by using an electrode having a small area as the first electrode, the length of the electrode in the second direction can be decreased. Also for example, as described above, by providing the cut in the corner(s) of the rectangular electrode, the length of the electrode in one or two second directions can be decreased.

In the case of a wound electrode group, for example, an electrode having a large width in a direction parallel to a winding axis can be used as the second electrode. In the case of an electrode group having a zigzag shape, for example, an electrode having a large width (width in a short-side direction) in a direction orthogonal to a side that is folded back can be used as the second electrode.

In a nonaqueous electrolyte secondary battery, a negative electrode is often enlarged in order to prevent the precipitation of lithium metal in the negative electrode. In view of the precipitation of lithium metal, the length(s) of the negative electrode(s) in the second direction is preferably made longer than the length(s) of the positive electrode(s) in the second direction. For example, in the case of a stacked electrode, a negative electrode having a large area can be used, and a positive electrode having a smaller area can be used. For example, in the case of a wound electrode, a negative electrode having a large width in a direction parallel to a winding axis can be used, and a positive electrode having a smaller width can be used. Likewise, for example, in the case of an electrode group having a zigzag shape, for example, a negative electrode having a large width in a direction orthogonal to a side that is folded back (width in the short-side direction) can be used, and a positive electrode having a smaller width can be used.

However, in the case of using a negative electrode active material providing an operating potential of about 0.5 V (vs. Li/Li$^+$) to a negative electrode, the problem of the precipitation of lithium metal in the negative electrode does not occur. Therefore, the electrode having the increased length in the second direction may be either the negative electrode or the positive electrode.

Alternatively, the lengths of the first electrode and the second electrode in the second direction may be equal to each other. In such a case, for example, by displacing the entire first electrode in the second direction with respect to the second electrode, the position of the first end of the first electrode and the position of the second end of the second electrode in the second direction can be made different from each other. Here, at one end in the second direction, the first end may protrude toward the outside of the electrode group with respect to the second end. At the other end in the second direction, the second end may protrude toward the outside of the electrode group with respect to the first end. On the side where the first end protrudes with respect to the second end, it is desirable that second ends disposed at different positions in the second direction are included in the electrode group. On the side where the second end protrudes with respect to the first end, it is desirable that first ends disposed at different positions in the first direction are included. That is, on either side of the electrode group, the position of the end portion of the electrode that does not protrude toward the outside of the electrode group is desirably displaced so as to suppress the concentration of forces due to external stress, the expansion of the electrode, and the like.

Hereinafter, the electrically insulating layer, the positive electrode, and the negative electrode will be described in detail. As described above, the positive electrode may be either one of the first electrode and the second electrode. The negative electrode may be the other of the first electrode and the second electrode.

(Electrically Insulating Layer)

For example, the electrically insulating layer is interposed between the first electrode and the second electrode, to electrically distinguish the first electrode and the second electrode from each other. For example, the electrically insulating layer may be provided between the positive electrode and the negative electrode to electrically distinguish the positive electrode and the negative electrode from each other.

The electrically insulating layer may contain insulating particles. As the insulating particles, for example, metal oxide solid particles and particles of an inorganic compound having lithium ion conductivity may be used. The insulating particles may be solid electrolyte particles.

The electrically insulating layer may further contain a gel electrolyte. The insulating particles and the gel electrolyte may form a composite.

The electrically insulating layer may be formed on one or both of the positive electrode and the negative electrode. Since a short circuit is apt to occur at the end portion of the electrode, the electrically insulating layer is desirably formed on the surface of an electrode having a larger area. From the viewpoint of preventing a short circuit, the electrically insulating layer is desirably formed on each of both the positive electrode and the negative electrode. On the other hand, from the viewpoint that the number of production steps increases, the electrically insulating layer is desirably formed on one of the respective electrodes.

The electrically insulating layer may be formed on one surface or both of reverse surfaces of each electrode.

The electrically insulating layer may be a single layer, or may include plural layers.

The thickness of the electrically insulating layer is preferably at least twice as large as the average particle size of the insulating particles contained in the electrically insulating layer. When the electrically insulating layer having such a thickness is formed, the uniformity of the thickness is likely to be obtained. It is more preferable that the thickness of the electrically insulating layer is at least twice as large as D90 in the particle size distribution of the contained insulating particles. D90 means a particle size at which a cumulative frequency from a small particle size side is 90% in a particle size distribution. This can prevent the bias of lithium ion conductivity within the electrically insulating layer, leading to an improvement in durability.

It is desirable that the thickness of the electrically insulating layer is 1.5 times or more of the size of the particle having the maximum average particle size among the particles contained in the positive electrode and the negative electrode. This provides a further improvement in short circuit resistance. The particles contained in the positive electrode may contain positive electrode active material particles and electro-conductive agent particles described later. The particles contained in the negative electrode may contain negative electrode active material particles and electro-conductive agent particles, which will be described later. When the electro-conductive agent has a shape having a large aspect ratio such as a flake shape (such as graphite) or an elliptical shape, for example, the thickness of the electrically insulating layer is determined based on the average particle size of the positive electrode active material particles or the negative electrode active material particles.

Examples of the metal oxide solid particles include particles made of a metal oxide such as aluminum oxide, zirconium oxide, or magnesium oxide. Among these, the use of aluminum oxide (alumina) or zirconium oxide (zirconia) makes it possible to more inexpensively and easily form the electrically insulating layer. In addition, metal oxides such as titanium oxide, niobium oxide, tantalum oxide, hafnium oxide, yttrium oxide, gallium oxide, and germanium oxide, and lanthanoid oxides such as lanthanum oxide, and the like may be used.

When particles made of aluminum oxide or zirconium oxide are used, although solid particles do exhibit function even when purity is low, high-purity solid particles are desirable. The use of the high-purity aluminum oxide particles or zirconium oxide particles makes it possible to avoid problems such as a side reaction at the interface between the electrically insulating layer and the electrode. The side reaction is apt to occur in a high temperature environment.

It is desirable that the average particle size of the metal oxide solid particles is from 0.1 µm to 5 µm. When the average particle size is less than 0.1 µm, ion conduction paths are restricted, which may cause an increase in internal resistance. When the average particle size exceeds 5 µm, the number of particles provided between the positive electrode and the negative electrode is decreased, which causes high probability of contact between the positive electrode and the negative electrode.

As inorganic solid particles having lithium ion conductivity, inorganic solid particles of a garnet structure are preferably used due to an advantage having high lithium ion conductivity and reduction resistance, while having a wide electrochemical window. As inorganic solid particles in a garnet structure, examples include, $Li_{5+x}A_xLa_{3-x}M_2O_{12}$ (A is at least one selected from the group consisting of Ca, Sr, and Ba, whereas M is at least one selected from the group consisting of Nb and Ta), $Li_3M_{2-x}L_2O_{12}$ (M is at least one selected from the group consisting of Ta and Nb, L is Zr, and $0 \leq x \leq 0.5$), $Li_{7-3x}Al_xLa_3Zr_3O_{12}$ ($0 \leq x \leq 0.5$), and $Li_7La_3Zr_2O_{12}$. Among others, $Li_{6.25}Al_{0.25}La_3Zr_3O_{12}$ and $Li_7La_3Zr_2O_{12}$ have advantages of excellent discharge performance and cycle life performance due to high lithium ion conductivity and electrochemical stability, and furthermore, have the advantage of being chemically stable with respect to organic solvents even as fine particles. Titanium-containing oxide having a defective perovskite structure ($La_{0.56}Li_{0.33}TiO_3$), a NASICON compound ($Li_{1.4}Zn(GeO_4)_4$), Li-β alumina, a LISICON compound ($Li_{3.6}Si_{0.6}P_{0.4}O_4$), and glass ceramics ($Li_2S$—$SiS_2$—$Li_3PO_4$) and the like may also be used.

Lithium ion conductive inorganic compound particles to be used preferably have lithium ion conductivity of $1 \times 10^{-10}$ $Scm^{-2}$ or more at room temperature (25° C.). Such lithium ion conductive inorganic compound particles as preferred example can increase a lithium ion concentration at the contact interface between the electrically insulating layer and the electrode, when the lithium ion conductive inorganic compound particles are combined with the gel electrolyte into a composite. The average particle size (diameter) of the lithium ion conductive inorganic compound is preferably from 0.01 µm to 8 µm. This range provides an improvement in the ion conductivity. The average particle size is more preferably from 0.05 µm to 0.2 µm. When particles are of more than 8 µm, diffusion of Li ions to the surface becomes difficult upon occurring of polarization, whereupon, effects are less likely obtained.

The electrically insulating layer may further include a binder. The binder can bind the insulting particles. Examples of the binder include polytetrafluoroethylene (PTFE), polyvinylidene fluoride (PVdF), polyvinyl pyrrolidone, acrylic binders, styrene-butadiene rubber, carboxymethyl cellulose (CMC), and salts of CMC. One of these may be used as the binder, or two or more may be used in combination as the binder.

The gel electrolyte may be, for example, a gel nonaqueous electrolyte in which a lithium salt is dissolved in a mixture prepared by mixing a gelling agent with an organic solvent. The concentration of the lithium salt is preferably from 0.2 M to 2 M.

As the gelling agent, for example, polymeric materials such as polyacrylonitrile (PAN), polyethylene oxide (PEO), polyvinylidene fluoride (PVdF), and polymethyl methacrylate, or mixtures thereof may be used.

As the organic solvent, there may be used, for example, ethylene carbonate (EC), propylene carbonate (PC), dimethyl carbonate (DMC), methyl ethyl carbonate (MEC), diethyl carbonate (DEC), γ-butyrolactone (GBL), acetonitrile (AN), ethyl acetate (EA), toluene, xylene, methyl acetate (MA), and the like. These organic solvents may be used singularly or as a mixed solvent.

As the lithium salt, there may be used, for example, lithium salts such as lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), lithium bistrifluoromethylsulfonylimide [LiTFSI; $LiN(CF_3SO_2)_2$], lithium bispentafluoroethylsulfonylimide [LiBETI; $LiN(C_2F_5SO_2)_2$], and the like. One of these lithium salts may be used singularly, or alternatively, two or more may be used as a mixed salt. $LiPF_6$ and $LiBF_4$ are desirable since more favorable cycle performance can be obtained.

When a composite of insulating particles and a gel electrolyte is formed, the gel electrolyte may permeate also into the first electrode and the second electrode.

The electrically insulating layer can be formed according to the following procedure, for example. First, insulating particles and a binder are mixed using a solvent to prepare a slurry. Here, as the solvent, for example, water, alcohol, N-methyl pyrrolidone (NMP), and the like may be used. The electrically insulating layer can be formed by applying the slurry to a substrate (for example, a positive electrode active material-containing layer or a negative electrode active material-containing layer described later) to form a coat and drying the coat.

The composite of insulating particles and a gel electrolyte can be formed, for example, by the following procedure. First, a solution is obtained by dissolving a gelling agent and a lithium salt in the above-described organic solvent. For example, the electrically insulating layer formed as described above is impregnated with the solution. Alternatively, an electrode group including the electrically insulating layer, the first electrode, and the second electrode is impregnated with the solution. By gelling the solution by heating, the composite of insulating particles and a gel electrolyte can be obtained.

(Positive Electrode)

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and lithium ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

Among these, lithium cobalt composite oxide, lithium nickel cobalt composite oxide, and lithium manganese composite oxide are desirable for having a charging/discharging potential of 3.8 V (vs. Li/Li$^+$) or more with respect to the oxidation-reduction potential of lithium, which allows a high battery capacity to be achieved.

When an ionic liquid is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with ionic liquids, cycle life can be improved. Details regarding the ionic liquid are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting lithium ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), ethylene-propylene-diene copolymers, styrene-butadiene rubber (SBR), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. The form of carbonaceous substances includes, for example, carbon particles, powder, fibrous powders, and the like. Desirable are shapes such as of powder or fibrous powders. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

As a positive electrode current collector, there may be used a metal foil, a metal alloy foil, a thin plate, a mesh, or a wire net, and the like containing a metal such as aluminum, stainless steel, titanium, or the like. The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a connection for connecting a positive electrode terminal.

The positive electrode can be produced, for example, by the following method. A positive electrode in sheet form can be produced by adding a binder to a positive electrode active material and an electro-conductive agent, followed by kneading and press rolling.

Alternatively, the positive electrode may be produced by the following method. First, positive electrode active material, electro-conductive agent, and binder are suspended in a solvent to prepare a slurry. As the solvent, there may be used, for example, toluene, N-methyl pyrrolidone (NMP), and the like. The slurry is applied onto one surface or both of reverse surfaces of a current collector. Next, the applied slurry is dried to form a layered stack of positive electrode active material-containing layer and current collector. Then, the layered stack is subjected to pressing, when necessary.

When producing a positive electrode used for a stacked electrode group, for example, a rectangular positive electrode may be produced. When producing a positive electrode used for a wound electrode group or an electrode group in zigzag shape, for example, a band-shaped positive electrode may be produced. In any case, for example, by leaving a portion not coated with the slurry on at least one peripheral side of the positive electrode current collector, a connection for connecting to a positive electrode terminal may be provided.

(Negative Electrode)

The negative electrode may include a negative electrode current collector and a negative electrode active material-containing layer. The negative electrode active material-containing layer may be formed on both of reverse surfaces or one surface of the negative electrode current collector. The negative electrode active material-containing layer may contain the negative electrode active material, and optionally an electro-conductive agent and a binder.

As a negative electrode active material, a compound is desirably used, in which the minimum potential reached when a secondary battery is charged is from 0.6 V to 1.45 V (vs. Li/Li') with respect to the oxidation-reduction potential of lithium, and the maximum potential reached when the secondary battery is discharged is from 1.6 V to 2.5 V (vs. Li/Li$^+$) with respect to the oxidation-reduction potential of lithium. The use of a compound satisfying these conditions as the negative electrode active material can prevent the precipitation of metal lithium during charge, so that the safety is enhanced. A titanium-containing composite oxide is more desirably used as the negative electrode active material. The use of the titanium-containing composite oxide makes it possible to reduce the electron conductivity of the entire negative electrode, thereby enhancing the safety against an internal short circuit. The negative electrode may contain one kind of compound singly as the negative electrode active material, or two or more kinds of compounds in combination.

Examples of titanium-containing oxides include lithium titanate having a ramsdellite structure (e.g., $Li_{2+y}Ti_3O_7$, $0<y\leq3$), lithium titanate having a spinel structure (e.g., $Li_{4+x}Ti_5O_{12}$, $0<x\leq3$), monoclinic titanium dioxide ($TiO_2$), anatase type titanium dioxide, rutile type titanium dioxide, a hollandite type titanium composite oxide, an orthorhombic titanium-containing composite oxide, and a monoclinic niobium titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0\leq a\leq6$, $0\leq b<2$, $0\leq c<6$, $0\leq d<6$, and $-0.5\leq\sigma\leq0.5$. Specific examples of the orthorhombic titanium-containing composite oxide include $Li_{2+a}Na_2Ti_6O_{14}$ ($0\leq a\leq6$).

Examples of the monoclinic niobium titanium composite oxide include a niobium titanium composite oxide having a monoclinic structure represented by $Li_aTiM_bNb_{2+\beta}O_{7+\delta}$. Here, M is at least one selected from the group consisting of Fe, V, Mo, and Ta. Subscripts in the composition formula are $0\leq a\leq5$, $0\leq b\leq0.3$, $-0.3\leq\beta\leq0.3$, and $-0.3\leq\delta\leq0.3$. Noted as a specific example of the monoclinic niobium titanium composite oxide is $Li_xNb_2TiO_7$ ($0\leq x\leq5$).

Examples of other monoclinic niobium titanium composite oxides include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0\leq x\leq5$, $0\leq y<1$, $0\leq z<2$, and $-0.3\leq\delta\leq0.3$.

Yet another example of the monoclinic niobium titanium composite oxide is a compound represented by $Ti_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0\leq y<1$, $0\leq z\leq2$, and $-0.3\leq\delta\leq0.3$.

Among the above compounds, the niobium titanium composite oxide having a monoclinic structure has a large capacity per weight. Therefore, the niobium titanium composite oxide can increase the battery capacity, which is more desirable as the negative electrode active material.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. The form of carbonaceous substances includes, for example, carbon particles, powder, fibrous powders, and the like. Desirable are shapes such as of powder or fibrous powders. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber (SBR), polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

The negative electrode current collector is preferably made of copper, nickel, stainless steel, aluminum, or an aluminum alloy including one or more elements selected from the group consisting of Mg, Ti, Zn, Mn, Fe, Cu, and Si. As the negative electrode current collector, a foil, a thin plate, a mesh, or a wire net and the like made of these materials may be used. The negative electrode current collector is preferably a foil having a thickness of from 5 µm to 20 µm. The negative electrode current collector that is a foil having such a thickness can maintain balance between the strength and weight reduction of the negative electrode.

The negative electrode current collector may include a portion where a negative electrode active material-containing layer is not formed on a surface of the negative electrode current collector. This portion may serve as a connection for connecting a negative electrode terminal.

The negative electrode can be produced, for example, by the following method. A negative electrode in sheet form can be produced by adding a binder to a negative electrode active material and an electro-conductive agent, followed by kneading and press rolling.

Alternatively, the negative electrode may be produced by the following method. First, negative electrode active material, electro-conductive agent, and binder are suspended in a solvent to prepare a slurry. As the solvent, there may be used, for example, water, N-methyl pyrrolidone (NMP), and the like. The slurry is applied onto one surface or both of reverse surfaces of a current collector. Next, the applied slurry is dried to form a layered stack of negative electrode active material-containing layer and current collector. Then, the layered stack is subjected to pressing, when necessary.

When producing a negative electrode used for a stacked electrode group, for example, a rectangular negative electrode may be produced. When producing a negative electrode used for a wound electrode group or an electrode group in zigzag shape, for example, a band-shaped negative electrode may be produced. In any case, for example, by leaving a portion not coated with the slurry on at least one peripheral side of the negative electrode current collector, a connection for connecting to a negative electrode terminal may be provided.

An electrode group according to a first embodiment includes an electrically insulating layer, a first electrode, and a second electrode. The first electrode and the second electrode are stacked in a first direction with the electrically insulating layer interposed therebetween. The first electrode includes plural first end portions in one or more second directions among directions orthogonal to the first direction. The plural first end portions are disposed at different positions in at least one of the second directions.

Since the electrode group according to the first embodiment includes the above configuration, the electrode group can achieve a secondary battery and a battery pack having excellent short circuit resistance, and a vehicle onto which the battery pack is installed.

Second Embodiment

According to the second embodiment, a secondary battery including an electrode group and a container member is provided. The container member houses the electrode group.

The secondary battery according to the second embodiment includes the electrode group according to the first embodiment as the electrode group.

The secondary battery may further include an electrolyte apart from the solid electrolyte that may be contained in the electrically insulating layer as insulating particles and the gel electrolyte that forms a composite with the insulating particles. The electrolyte is housed in the container member. The electrolyte may be held in the electrode group.

In addition, the secondary battery may further include a positive electrode terminal electrically connected to the positive electrode and a negative electrode terminal electrically connected to the negative electrode.

The secondary battery according to the second embodiment may be, for example, a lithium secondary battery. The secondary battery also includes nonaqueous electrolyte secondary batteries containing nonaqueous electrolyte(s).

Hereinafter, the container member, the negative electrode terminal, the positive electrode terminal, and electrolyte will be described in detail.

(Container Member)

As the container member, for example, a container made of laminate film or a container made of metal, polymer, or ceramics may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). As the metal layer, there may be used a material made of aluminum, an aluminum alloy, copper, stainless steel or the like. The metal layer is preferably made of aluminum foil or an aluminum alloy foil, so as to reduce weight. The laminate film may be formed into the shape of a container member, by heat-sealing.

When a container made of a laminate film is used, and an internal gas is generated in the container, the internal gas can be detected as a change in the appearance of the battery. Therefore, the container member made of a laminate film is desirably used.

The wall thickness of the metal container is, for example, 1 mm or less, more preferably 0.5 mm or less, and still more preferably 0.2 mm or less.

The metal case is made, for example, of aluminum, an aluminum alloy, iron, or stainless steel. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(Positive Electrode Terminal)

The positive electrode terminal may be made of, for example, a material that is electrically stable in the potential range of 3 V to 4.5 V (vs. Li/Li$^+$) relative to the redox potential of lithium, and has electrical conductivity. Examples of the material for the positive electrode terminal include titanium, aluminum, and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

The shape of the positive electrode terminal is not particularly limited. The shape of the positive electrode terminal may be, for example, a ribbon shape, a plate shape, or a rod shape.

For example, one end of the positive electrode terminal may be electrically connected to the positive electrode, and the other end may be drawn out of the container member. Through the positive electrode terminal, electricity can be passed between the positive electrode and the outside of the battery. A method of electrically connecting the positive electrode terminal and the positive electrode is not particularly limited, but for example, the positive electrode terminal may be welded onto a positive electrode current collector.

(Negative electrode Terminal)

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy, which are light and excellent for weld joining, is preferred as the material for the negative electrode terminal. The negative electrode terminal is preferably made of the same material as the negative electrode current collector, in order to reduce the contact resistance with the negative electrode current collector.

The shape of the negative electrode terminal is not particularly limited. The shape of the negative electrode terminal may be, for example, a ribbon shape, a plate shape, or a rod shape.

For example, one end of the negative electrode terminal may be electrically connected to the negative electrode, and the other end may be drawn out of the container member. Through the negative electrode terminal, electricity can be passed between the negative electrode and the outside of the battery. A method of electrically connecting the negative electrode terminal and the negative electrode is not particularly limited, but for example, the negative electrode terminal may be welded onto a negative electrode current collector.

(Electrolyte)

As the other electrolyte aside from the solid electrolyte that may be included as insulating particles in the electrically insulating layer, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to, oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ionic liquid containing lithium ions may be used as the nonaqueous electrolyte.

The ionic liquid indicates compounds among organic salts made of combinations of organic cations and anions, which are able to exist in a liquid state at room temperature (15° C. to 25° C.). The ionic liquid includes an ionic liquid which exists alone as a liquid, an ionic liquid which becomes a liquid upon mixing with an electrolyte salt, and mixtures thereof. In general, the melting point of the ionic liquid used in secondary batteries is 25° C. or below. The organic cations generally have a quaternary ammonium framework, such as those of imidazolium and bipyrdinium.

An example of a secondary battery according to a second embodiment will be described with reference to the drawings.

Figure 11:
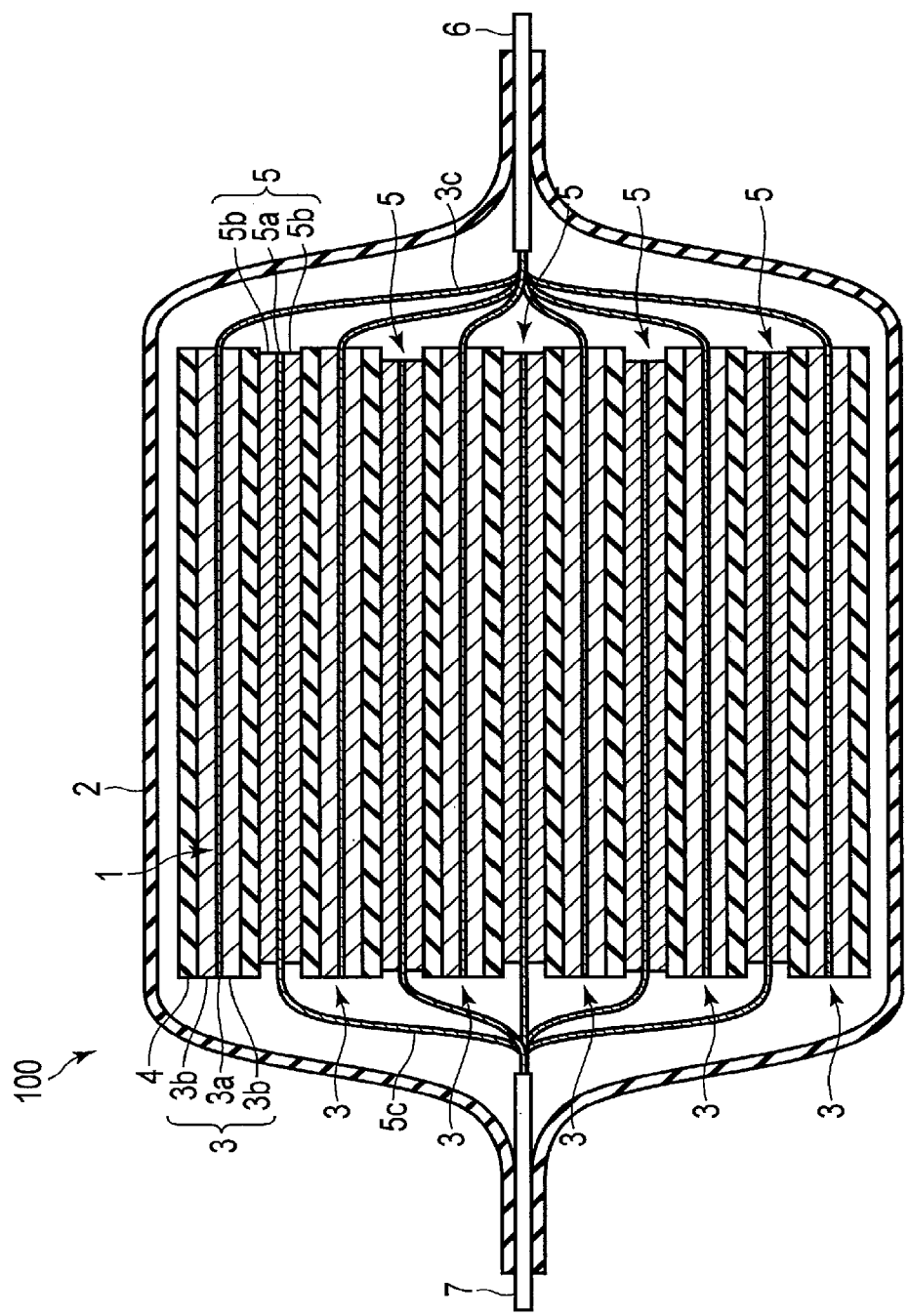
FIG. 11 is a perspective view schematically showing an example of a secondary battery according to an embodiment.

FIG. 11 is a schematic cross-sectional view of a secondary battery as an example according to a second embodiment. More specifically, FIG. 11 is a cross section taken along directions toward which later-described positive and negative electrode terminals extend out from a container member. A secondary battery 100 shown in FIG. 11 includes a container member 2 and an electrode group 1. The electrode group 1 is housed in the container member 2. FIG. 11 is a cross-sectional view taken along the first direction of the electrode group 1.

The container member 2 is a bag-shaped container member made of a laminate film including two resin layers and a metal layer interposed therebetween.

As shown in FIG. 11, the electrode group 1 is a stacked electrode group. The stacked electrode group 1 is an example of a stacked aspect of the electrode group according to the first embodiment. The stacked electrode group 1 has a structure in which negative electrodes 3 and positive electrodes 5 are alternately stacked with electrically insulating layers 4 interposed therebetween. In FIG. 11, the electrically insulating layer 4 is also provided on each of the uppermost layer and the lowermost layer of the electrode group 1, that is, on the outer side of the negative electrodes 3 located at each of both farthest ends in the first direction. When an electrically insulating material such as a laminate film is used as the material of the container member 2, the electrically insulating layer 4 provided outside the negative electrode 3 at the farthest ends may be omitted.

The electrode group 1 includes plural negative electrodes 3. Each of the negative electrodes 3 includes a negative electrode current collector 3a, and a negative electrode active material-containing layer 3b supported on each of both reverse surfaces of the negative electrode current collector 3a. The negative electrode current collector 3a of each of the negative electrodes 3 includes at one side, a portion 3c in which the negative electrode active material-containing layer 3b is not supported on any surface. The plural portions 3c are electrically connected to a band-shaped negative electrode terminal 6. The tip of the band-shaped negative electrode terminal 6 is drawn out of the container member 2.

The electrode group 1 includes plural positive electrodes 5. Each of the positive electrodes 5 includes a positive electrode current collector 5a, and a positive electrode active material-containing layer 5b supported on each of both reverse surfaces of the positive electrode current collector 5a. The positive electrode current collector 5a of each positive electrode 5 includes at one side, a portion 5c in which the positive electrode active material-containing layer 5b is not supported on any surface. The portion 5c in the positive electrode current collector 5a, at which the positive electrode active material-containing layer 5b is not supported, is located on the opposite side of the electrode group 1 with respect to a portion 3c in the negative electrode current collector 3a, at which the negative electrode active material-containing layer 3b is not supported. The plural portions 5c are electrically connected to a band-shaped positive electrode terminal 7. The tip of the band-shaped positive electrode terminal 7 is located on the opposite side relative to the negative electrode terminal 6, and drawn out of the container member 2.

In describing the secondary battery 100 shown in FIG. 11, the positive electrode 5 is regarded as a first electrode, and the negative electrode 3 is regarded as a second electrode. In the description herein, a second direction refers to a direction parallel to the width direction of the positive electrodes 5 and the negative electrodes 3 among directions orthogonal to the stacking direction (first direction) of the positive electrodes 5 and the negative electrodes 3. That is, in the description herein, the second direction refers to a direction parallel to a line connecting the negative electrode terminal 6 and the positive electrode terminal 7 in FIG. 11. The second direction includes a direction from the negative electrode terminal 6 to the positive electrode terminal 7, and an opposite direction thereof, that is, a direction from the positive electrode terminal 7 to the negative electrode terminal 6.

As shown in FIG. 11, the ends (hereinafter, second end portions) of the plural negative electrodes 3 (second electrodes) in the second direction within the electrode group 1 are aligned. On the other hand, the positions of the ends (hereinafter referred to as first end portions) of the plural positive electrodes 5 (first electrodes) in the second direction are partially different from each other, and not aligned.

In the electrode group 1 shown in FIG. 11, the positions of the first end portions of the plural positive electrodes 5 (first electrodes) are in a positional relationship of being partially displaced from each other. Therefore, even when force is applied from outside the secondary battery 100 or the electrode group 1 expands, force does not concentrate very much at the first end portion, so that a short circuit is less likely to occur at the first end portions.

The secondary battery according to the second embodiment is not limited to the secondary battery of the configuration shown in FIG. 11, and may be, for example, a battery of a configuration as shown in FIGS. 12 and 13.

FIG. 12 is a cross-sectional view schematically showing an example of a secondary battery according to the second embodiment. FIG. 13 is an enlarged cross-sectional view of section B of the secondary battery shown in FIG. 12.

The secondary battery 100 shown in FIGS. 12 and 13 includes a bag-shaped container member 2 shown in FIG. 12, a wound electrode group 1 shown in FIGS. 12 and 13, and an electrolyte, which is not shown. The electrode group 1 is housed in the bag-shaped container member 2. FIGS. 12 and 13 are a cross-sectional view taken along a plane orthogonal to the winding axis of the electrode group 1 and a partially enlarged view thereof, respectively.

The bag-shaped container member 2 is made of a laminate film including two resin layers and a metal layer sandwiched between the resin layers.

As shown in FIG. 12, the electrode group 1 is a wound electrode group in a flat form. This wound electrode group 1 is an example of the wound aspect according to the first embodiment, and may be the electrode group 1 shown in FIG. 9, for example. The wound electrode group 1 in a flat form includes a negative electrode 3, an electrically insulating layer 4, and a positive electrode 5, as shown in FIG. 13. The electrically insulating layer 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 13. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 12, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

The secondary battery according to the second embodiment is not limited to the specific examples shown in FIGS. 11 to 13, and the electrode group 1 may be an electrode group taking any form that the electrode group according to the first embodiment can take. For example, in FIGS. 11 to 13, the positive electrode 5 is regarded as a first electrode, and the negative electrode 3 is regarded as a second electrode. The secondary battery according to the embodiment is not limited to such an aspect, and includes, for example, an aspect in which the negative electrode 3 is regarded as a first electrode and the positive electrode 5 is regarded as a second electrode. The electrode group 1 included in the secondary battery 100 is not limited to a stacked electrode group or a wound electrode group, and may be, for example, an electrode group having a zigzag shape.

The secondary battery according to the second embodiment includes the electrode group according to the first embodiment. Therefore, the secondary battery according to the second embodiment can exhibit excellent short circuit resistance.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

FIG. 14 is a perspective view schematically showing an example of the battery module according to the third embodiment. A battery module 200 shown in FIG. 14 includes five single-batteries 100a to 100e, four bus bars 21, a positive electrode-side lead 22, and a negative electrode-side lead 23. Each of the five single-batteries 100a to 100e is a secondary battery according to the second embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 14 is a battery module of five in-series connection.

As shown in FIG. 14, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the third embodiment includes the secondary battery according to the second embodiment. Thus, the battery module has excellent short-circuit resistance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 15:
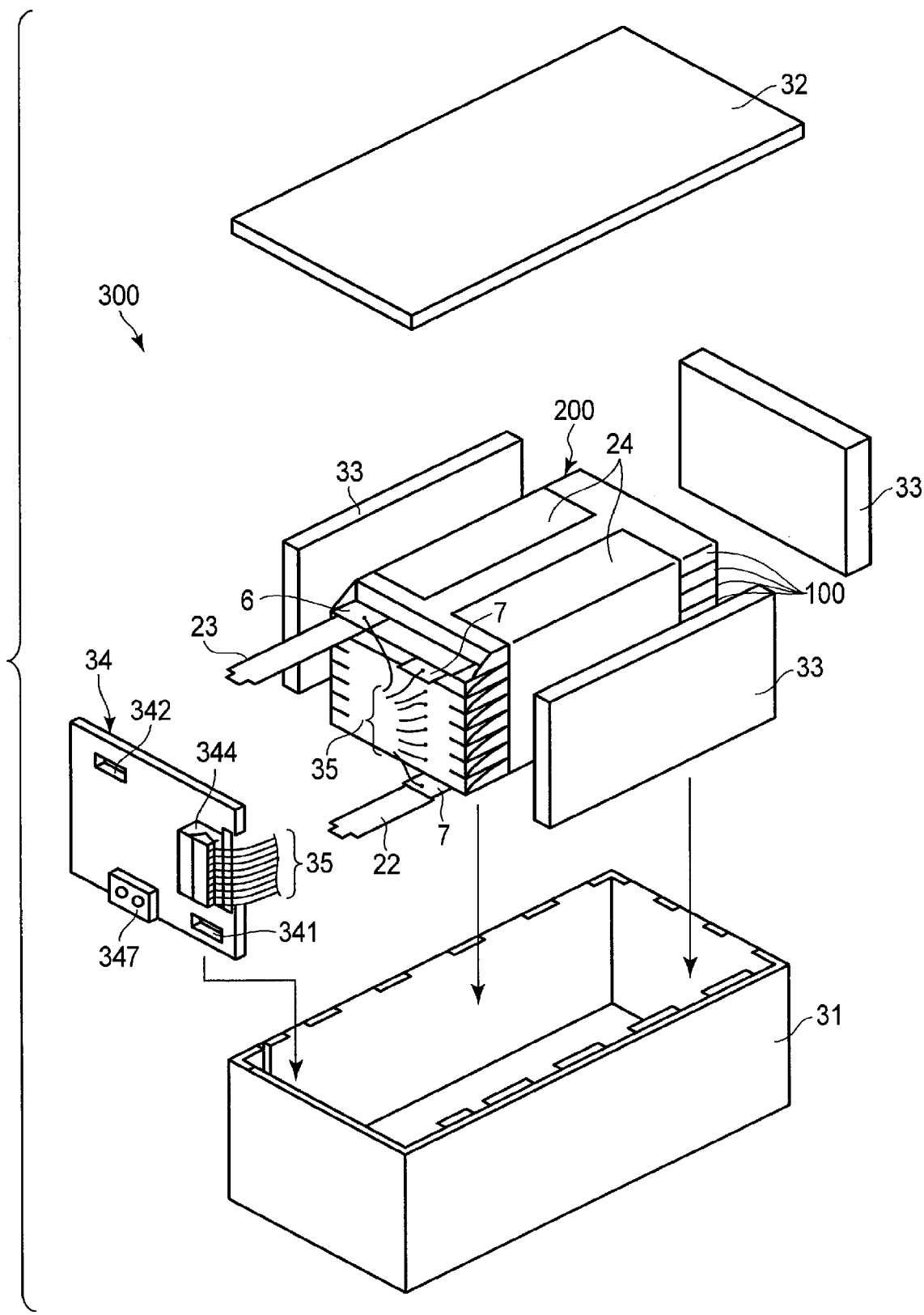
FIG. 15 is an exploded perspective view schematically showing an example of a battery pack according to an embodiment.
Figure 16:
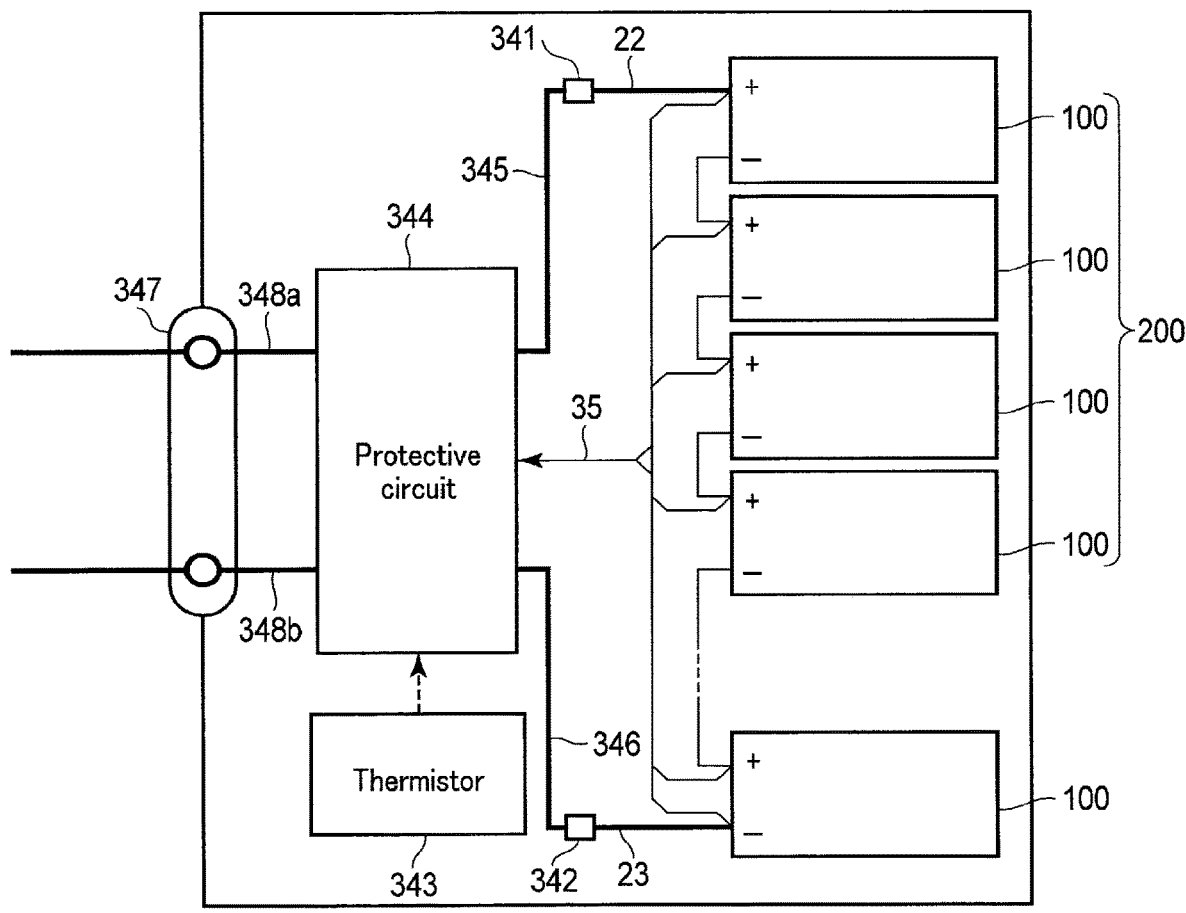
FIG. 16 is a block diagram showing an example of an electric circuit of the battery pack shown in FIG. 15.

FIG. 15 is an exploded perspective view schematically showing an example of the battery pack according to the fourth embodiment. FIG. 16 is a block diagram showing an example of an electric circuit of the battery pack shown in FIG. 15.

A battery pack 300 shown in FIGS. 15 and 16 includes a housing container 31, a lid 32, protective sheets 33, a battery module 200, a printed wiring board 34, wires 35, and an insulating plate (not shown).

The housing container 31 shown in FIG. 15 is a square bottomed container having a rectangular bottom surface. The housing container 31 is configured to be capable of storing the protection sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 may have a structure shown in FIG. 12, for example. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 16. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fourth embodiment is provided with the secondary battery according to the second embodiment or the battery module according to the third embodiment. Accordingly, the battery pack according to the fourth embodiment can exhibit excellent short circuit resistance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may have plural battery packs installed. In such a case, the battery packs may be electrically connected in series, electrically connected in parallel, or electrically connected in a combination of in-series connection and in-parallel connection.

An example of the vehicle according to the fifth embodiment is explained below, with reference to the drawings.

Figure 17:
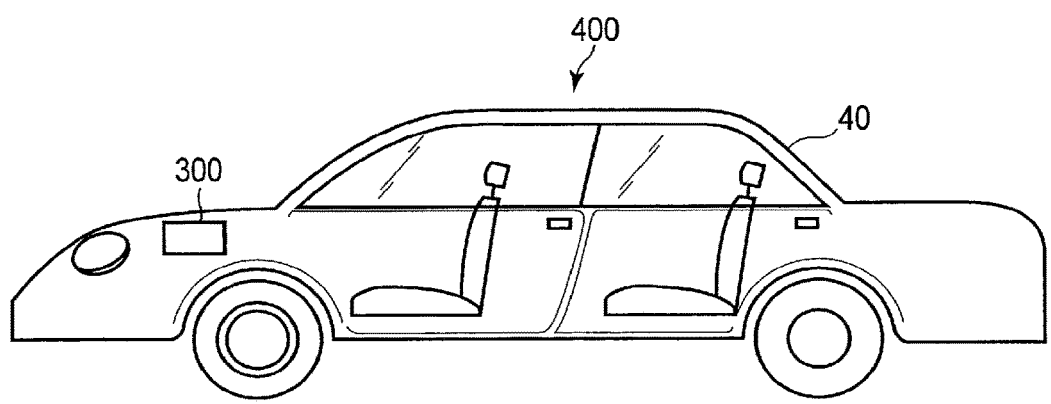
FIG. 17 is a cross-sectional view schematically showing an example of a vehicle according to an embodiment.

FIG. 17 is a cross-sectional view schematically showing an example of a vehicle according to the fifth embodiment.

A vehicle 400, shown in FIG. 17 includes a vehicle body 40 and a battery pack 300 according to the fourth embodiment. In the example shown in FIG. 17, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 17, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 18:
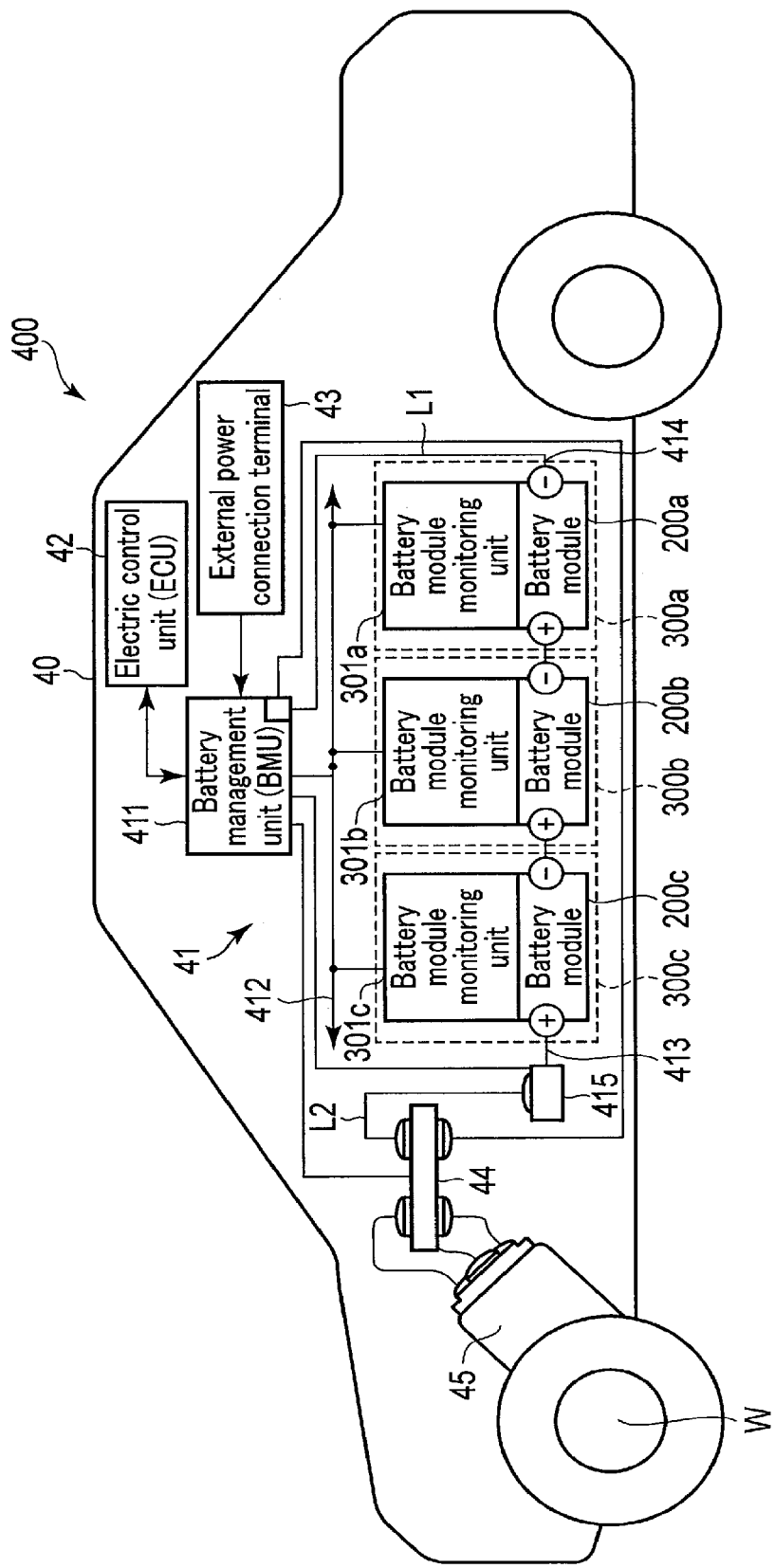
FIG. 18 is a diagram schematically showing another example of the vehicle according to the embodiment.

Next, with reference to FIG. 18, an aspect of operation of the vehicle according to the fifth embodiment is explained.

FIG. 18 is a view schematically showing another example of the vehicle according to the fifth embodiment. A vehicle 400, shown in FIG. 18, is an electric automobile.

The vehicle 400, shown in FIG. 18, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 18, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 18) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment is installed with the battery pack according to the fourth embodiment. Accordingly, vehicle exhibits high reliability by virtue of the short circuit resistance of the battery pack being excellent.

EXAMPLES

Hereinafter, Examples will be described in detail.

Production of Secondary Battery

Example 1

A lithium nickel cobalt manganese composite oxide (LiNi$_{1/3}$Co$_{1/3}$Mn$_{1/3}$O$_2$) powder having a particle size of 5 μm (D50 value) was prepared as a positive electrode active material. 90% by weight of the positive electrode active material, 2% by weight of acetylene black, 3% by weight of artificial graphite having a particle size of 3 μm (D50 value), and 5% by weight of polyvinylidene fluoride were mixed to obtain a mixture, and N-methylpyrrolidone (NMP) as a solvent was added to the mixture to obtain a slurry. This slurry was applied to each of both reverse surfaces of an aluminum foil having a thickness of 15 µm, and dried, followed by press rolling to produce a positive electrode sheet having a thickness of 100 µm. Three slabs cut out from the positive electrode sheet, each having a size of a width of 67 mm and a length of 92 mm, were used as A size positive electrodes. Three slabs cut out from the positive electrode sheet, each having a size of a width of 66 mm and a length of 92 mm, were used as B size positive electrodes. Three slabs cut out from the positive electrode sheet, each having a size of a width of 65 mm and a length of 92 mm, were used as C size positive electrodes. When the slurry was applied to the aluminum foil, the slurry was not applied to a terminal portion of 5 mm in a longitudinal direction, and this portion was left as an active material layer-non-supporting portion.

A monoclinic niobium titanium composite oxide ($Nb_2TiO_7$) powder having a particle size of 3 µm (D50 value) was prepared as a negative electrode active material. A slurry was prepared by adding 90% by weight of the niobium titanium composite oxide powder, 5% by weight of artificial graphite having a particle size of 5 µm (D50 value), and 5% by weight of polyvinylidene fluoride (PVdF) to an NMP solution, followed by mixing. The obtained slurry was applied to each of both reverse surfaces of an aluminum foil having a thickness of 25 µm, and dried, followed by press rolling to prepare a negative electrode sheet having a thickness of 78 µm. From the negative electrode sheet, slabs each having a size of a width of 68 mm and a length of 93 mm were cut out to obtain negative electrodes. When the slurry was applied to the aluminum foil, the slurry was not applied to one end portion (width: 5 mm) parallel to a longitudinal direction, and this portion was left as an active material layer-non-supporting portion. Ten negative electrodes were produced.

$Li_7La_3Zr_2O_{12}$ particles having an average primary particle size of 0.1 µm were prepared as insulating particles of an electrically insulating layer. As the electrically insulating layer, a composite electrolyte layer having a thickness of 10 µm and containing the insulating particles and a gel nonaqueous electrolyte was formed on the negative electrode in the following manner.

First, prepared insulating particles were dispersed in a binder solution prepared by dissolving a PVdF binder in a NMP solvent to obtain a dispersion. The dispersion was applied onto each of both reverse surfaces of the negative electrode using a coating spray. After heating and drying, a stacked electrode group was constructed by stacking the positive electrodes and the negative electrodes as follows.

The positive electrodes and the negative electrodes were stacked in the order of the negative electrode, C size positive electrode, negative electrode, A size positive electrode, negative electrode, B size positive electrode, negative electrode, C size positive electrode, negative electrode, A size positive electrode, negative electrode, B size positive electrode, negative electrode, C size positive electrode, negative electrode, A size positive electrode, negative electrode, B size positive electrode, and negative electrode. The positive electrodes and the negative electrodes were stacked such that the centers of the positive electrodes and the negative electrodes in an in-plane direction overlapped each other.

Next, the active material layer-non-supporting portions of the positive electrodes were bundled, and an aluminum foil as a positive electrode terminal was welded to the bundled portion. The active material layer-non-supporting portions of the negative electrodes were bundled, and an aluminum foil as a negative electrode terminal was welded to the bundled portion. Thus, an electrode group was constructed.

In the stacked electrode group thus constructed, the positions of both ends in a width direction (short-side direction) were different between the A size positive electrodes and the B size positive electrodes, which provided a displacement width S of 0.5 mm. The displacement width S between the A size positive electrodes and the C size positive electrodes in the width direction was 1 mm. The displacement width S between the B size positive electrodes and the C size positive electrodes in the width direction was 0.5 mm. On the other hand, the positions of both ends of all the positive electrodes in a longitudinal direction (long-side direction) were aligned. The positions of both ends of all the negative electrodes in both the width direction and the longitudinal direction were aligned.

Separately, a mixed solvent (volume ratio 1:2) of propylene carbonate (PC) and diethyl carbonate (DEC) was prepared, and 1.2 M of $LiPF_6$ was dissolved in this mixed solvent to prepare a liquid nonaqueous electrolyte. A polyacrylonitrile (PAN) polymer as a gelling agent was added to the liquid nonaqueous electrolyte to obtain a mixed solution containing 2% by weight of PAN.

The obtained electrode group was wrapped so as to be sandwiched between two outer sheets each made of a laminate film. As the laminate film, a multilayer film including an aluminum layer and a resin layer was used. The two outer sheets were heat-sealed in a bag shape such that three sides of one of the two outer sheets and three sides of the other outer sheet overlapped, and the electrode group was then impregnated with a mixed solution containing PAN. The amount of the mixed solution was adjusted such that the weight ratio of the insulating particles ($Li_7La_3Zr_2O_{12}$ particles), the mixed solvent (PC/DEC mixed solvent), and the gelling agent (PAN) was 96:3.2:0.8. The bag formed of the outer sheets was closed by heat-sealing to house the electrode group and the mixed solution, and then heated to gel the mixed solution.

In this manner, a secondary battery of Example 1 having within, the structure shown in FIG. 2 was produced.

Example 2

A positive electrode sheet was prepared in the same procedure as in Example 1. Nine positive electrodes were obtained by cutting out the positive electrode sheet, each cut out to have a size of a width of 67 mm and a length of 92 mm.

A negative electrode sheet was produced in the same procedure as in Example 1. Four slabs cut out from the negative electrode sheet, each cut out to have a size of a width of 67 mm and a length of 92 mm, were used as A size negative electrodes; three slabs cut out from the negative electrode sheet, each cut out to have a size of a width of 66 mm and a length of 92 mm, were used as B size negative electrodes; and three slabs cut out from the negative electrode sheet, each cut out to have a size of a width of 65 mm and a length of 92 mm, were used as C size negative electrodes.

A dispersion containing insulating particles was applied onto the positive electrodes and the negative electrodes, and dried by heating. Then, the positive electrodes and the negative electrodes were stacked in the order of the A size negative electrode, positive electrode, B size negative electrode, positive electrode, C size negative electrode, positive electrode, A size negative electrode, positive electrode, B size negative electrode, positive electrode, C size negative electrode, positive electrode, A size negative electrode, positive electrode, B size negative electrode, positive electrode, C size negative electrode, positive electrode, and A size negative electrode to construct a stacked electrode group. The positive electrodes and the negative electrodes were stacked such that the centers of the positive electrodes and the negative electrodes in an in-plane direction overlapped each other.

In the stacked electrode group thus constructed, the positions of both ends in a width direction (short-side direction) were different between the A size negative electrodes and the B size negative electrodes, which provided a displacement width S of 0.5 mm. The displacement width S between the A size negative electrodes and the C size negative electrodes in the width direction was 1 mm. The displacement width S between the B size negative electrodes and the C size negative electrodes in the width direction was 0.5 mm. On the other hand, the positions of both the ends of all the negative electrodes in a longitudinal direction (long-side direction) were aligned. The positions of both the ends of all the positive electrodes in both the width direction and the longitudinal direction were aligned.

A secondary battery was produced in the same manner as in Example 1 except that the obtained stacked electrode group was used.

Example 3

A positive electrode sheet was prepared in the same procedure as in Example 1. Three slabs cut out from the positive electrode sheet, each cut out to have a size of a width of 67 mm and a length of 92 mm, were used as D size positive electrodes; three slabs cut out from the positive electrode sheet, each cut out to have a size of a width of 66 mm and a length of 91 mm, were used as E size positive electrodes; and three slabs cut out from the positive electrode sheet, each cut out to have a size of a width of 65 mm and a length of 90, mm were used as F size positive electrodes.

A negative electrode sheet was produced in the same procedure as in Example 1. Ten negative electrodes were obtained by cutting out from the negative electrode sheet, each cut out to have a size of a width of 67 mm and a length of 92 mm.

A dispersion containing insulating particles was applied onto the positive electrodes and the negative electrodes, and dried by heating. Then, the positive electrodes and the negative electrodes were stacked in the order of the negative electrode, F size positive electrode, negative electrode, E size positive electrode, negative electrode, D size positive electrode, negative electrode, E size positive electrode, negative electrode, D size positive electrode, negative electrode, F size positive electrode, negative electrode, D size positive electrode, negative electrode, F size positive electrode, negative electrode, E size positive electrode, and negative electrode to construct a stacked electrode group. The positive electrodes and the negative electrodes were stacked such that the centers of the positive electrodes and the negative electrodes in an in-plane direction overlapped each other.

In the stacked electrode group thus constructed, the positions of both ends of the D size positive electrodes were different from the positions of both ends of the E size positive electrodes in a width direction (short side direction), which provided a displacement width S of 0.5 mm. The displacement width S between the D size positive electrodes and the F size positive electrodes in the width direction was 1 mm. The displacement width S between the E size positive electrodes and the F size positive electrodes in the width direction was 0.5 mm.

The positions of both ends of the D size positive electrodes were different from the positions of both ends of the E size positive electrodes in the longitudinal direction (long-side direction), which provided a displacement width S of 0.5 mm. The displacement width S between the D size positive electrodes and the F size positive electrodes in the longitudinal direction was 1 mm. The displacement width S between the E size positive electrodes and the F size positive electrodes in the longitudinal direction was 0.5 mm.

The positions of both ends of all the negative electrodes in both the width direction and the longitudinal direction were aligned.

A secondary battery was produced in the same manner as in Example 1 except that the obtained stacked electrode group was used.

Example 4

A positive electrode sheet was prepared in the same procedure as in Example 1. Nine slabs were cut out from the positive electrode sheet, each cut out to have a size of a width of 67 mm and a length of 92 mm. With respect to three of the slabs, a cut was provided at each of four corners with a straight line orthogonal to a straight line drawn at an angle of 45° from the respective corner as a cut line, so that a distance S1' was 1 mm. With respect to three other slabs, a similar cut was provided at each of four corners so that a distance S1" was 2 mm.

A negative electrode sheet was produced in the same procedure as in Example 1. Ten negative electrodes were obtained by cutting out from the negative electrode sheet, each cut out to have a size of a width of 67 mm and a length of 92 mm.

A dispersion containing insulating particles was applied onto the positive electrodes and the negative electrodes, and dried by heating. Then, the positive electrodes and the negative electrodes were stacked in the order of the negative electrode, positive electrode (S1"=2 mm), negative electrode, positive electrode (S1'=1 mm), negative electrode, positive electrode (no cut), negative electrode, positive electrode (S1'=1 mm), negative electrode, positive electrode (no cut), negative electrode, positive electrode (S1"=2 mm), negative electrode, positive electrode (no cut), negative electrode, positive electrode (S1'=1 mm), negative electrode, positive electrode (S1"=2 mm), and negative electrode to construct a stacked electrode group. The positive electrodes and the negative electrodes were stacked such that the centers of the positive electrodes and the negative electrodes in an in-plane direction overlapped each other.

In the constructed stacked electrode group, between the positive electrode not provided with any cut and the positive electrode provided with a cut at a distance S1' of 1 mm, the displacement width S between the respective positions of each end at the four corners corresponded to the distance S1', and was 1 mm. Between the positive electrode not provided with any cut and the positive electrode provided with a cut at a distance S1" of 2 mm, the displacement width S between the respective positions of each end at the four corners corresponded to the distance S1", and was 2 mm. Between the positive electrode provided with a cut at a distance S1' of 1 mm and the positive electrode provided with a cut at a distance S1" of 2 mm, the displacement width S between the respective positions of each end at the four corners corresponded to the distance S2, and was 1 mm.

A secondary battery including a structure shown in FIG. 5 was produced in the same manner as in Example 1 except that the obtained stacked electrode group was used.

Example 5

A positive electrode sheet was prepared in the same procedure as in Example 1. Three slabs cut out from the positive electrode sheet, each cut out to have a size of a width of 67 mm and a length of 92 mm, were used as A size positive electrodes; three slabs cut out from the positive electrode sheet, each cut out to have a size of a width of 66 mm and a length of 92 mm, were used as B size positive electrodes; and three slabs cut out from the positive electrode sheet, each cut out to have a size of a width of 65 mm and a length of 92 mm, were used as C size positive electrodes. With respect to all of these positive electrodes, a cut was provided at each of four corners with a straight line orthogonal to a straight line drawn at an angle of 45° from the respective corner as a cut line, so that a distance S1 was 1 mm.

A negative electrode sheet was produced in the same procedure as in Example 1. Ten slabs were cut out from the negative electrode sheet, each cut out to have a size of a width of 67 mm and a length of 92 mm to obtain negative electrodes.

A dispersion containing insulating particles was applied onto the positive electrodes and the negative electrodes, and dried by heating. Then, the positive electrodes and the negative electrodes were stacked in the order of the negative electrode, C size positive electrode (with cut), negative electrode, A size positive electrode (with cut), negative electrode, B size positive electrode (with cut), negative electrode, C size positive electrode (with cut), negative electrode, A size positive electrode (with cut), negative electrode, B size positive electrode (with cut), negative electrode, C size positive electrode (with cut), negative electrode, A size positive electrode (with cut), negative electrode, B size positive electrode (with cut), and negative electrode to construct a stacked electrode group. The positive electrodes and the negative electrodes were stacked such that the centers of the positive electrodes and the negative electrodes in an in-plane direction overlapped each other.

In the stacked electrode group thus constructed, the positions of both ends in a width direction (short-side direction) were different between the A size positive electrodes and the B size positive electrodes, which provided a displacement width S of 0.5 mm. The displacement width S between the A size positive electrodes and the C size positive electrodes in the width direction was 1 mm. The displacement width S between the B size positive electrodes and the C size positive electrodes in the width direction was 0.5 mm.

Between the A size positive electrodes and the B size positive electrodes, the displacement width S of the position of each end at the four corners subjected to cut processing was 0.7 mm. Between the A size positive electrodes and the C size positive electrodes, the displacement width S of the position of each end at the four corners subjected to cut processing was 0.14 mm. Between the B size positive electrodes and the C size positive electrodes, the displacement width S of the position of each end at the four corners subjected to cut processing was 0.7 mm.

On the other hand, the positions of both ends of all the positive electrodes in a longitudinal direction (long-side direction) were aligned. The positions of both ends of all the negative electrodes in both a width direction and a longitudinal direction were aligned.

A secondary battery was produced in the same manner as in Example 1 except that the obtained stacked electrode group was used.

Example 6

A positive electrode sheet was prepared in the same procedure as in Example 1. Nine slabs were cut out from the positive electrode sheet to have a size of a width of 67 mm and a length of 92 mm. With respect to three of the slabs, a quarter-arc-shaped cut was provided at each of four corners so that a distance $S1_I$ was 1 mm. With respect to three other slabs, a quarter-arc-shaped cut was provided at each of four corners so that a distance $S1_{II}$ was 2 mm. With respect to the remaining three slabs, a quarter-arc-shaped cut was provided at each of four corners so that a distance $S1_{III}$ was 3 mm.

A negative electrode sheet was produced in the same procedure as in Example 1. Ten slabs were cut out to have a size of a width of 67 mm and a length of 92 mm to obtain negative electrodes.

A dispersion containing insulating particles was applied onto the positive electrodes and the negative electrodes, and dried by heating. Then, the positive electrodes and the negative electrodes were stacked in the order of the negative electrode, positive electrode ($S1_{III}$=3 mm), negative electrode, positive electrode ($S1_{II}$=2 mm), negative electrode, positive electrode ($S1_I$=1 mm), negative electrode, positive electrode ($S1_I$=1 mm), negative electrode, positive electrode ($S1_{II}$=2 mm), negative electrode, positive electrode ($S1_I$=1 mm), negative electrode, positive electrode ($S1_{III}$=3 mm), negative electrode, positive electrode ($S1_{II}$=2 mm), negative electrode, positive electrode ($S1_{III}$=3 mm), and negative electrode to construct a stacked electrode group. The positive electrodes and the negative electrodes were stacked such that the centers of the positive electrodes and the negative electrodes in an in-plane direction overlapped each other.

In the constructed stacked electrode group, between the positive electrodes provided with the cut at a distance $S1_I$ of 1 mm and the positive electrodes provided with the cut at a distance $S1_{II}$ of 2 mm, the displacement width S between the positions of each end at the four corners corresponded to a distance S2, and was 1 mm. Between the positive electrodes provided with the cut at a distance $S1_I$ of 1 mm and the positive electrodes provided with the cut at a distance $S1_{III}$ of 3 mm, the displacement width S between the positions of each end at the four corners was 2 mm. Between the positive electrodes provided with the cut at a distance $S1_{II}$ of 2 mm and the positive electrodes provided with the cut at a distance $S1_{III}$ of 3 mm, the displacement width S between the positions of each end at the four corners corresponded to the distance S2, and was 1 mm.

A secondary battery including a structure shown in FIG. 7 was produced in the same manner as in Example 1 except that the obtained stacked electrode group was used.

Example 7

A lithium titanate ($Li_4Ti_5O_{12}$) powder having a particle size of 3 μm (D50 value) was prepared as a negative electrode active material. A slurry was prepared by adding 90% by weight of the prepared lithium titanate powder, 5% by weight of artificial graphite having a particle size of 5 μm (D50 value), and 5% by weight of polyvinylidene fluoride (PVdF) to an NMP solution, followed by mixing. Using this slurry, a negative electrode sheet having a thickness of 113 μm was produced, and ten negative electrodes having the same dimensions as those in Example 1 were cut out.

A secondary battery was produced in the same manner as in Example 1 except that these negative electrodes were used.

Example 8

An orthorhombic titanium-containing composite oxide ($Li_2Na_{1.5}Ti_{5.5}Nb_{0.5}O_{14}$) powder having a particle size of 2 μm (D50 value) was prepared as a negative electrode active material. A slurry was prepared by adding 90% by weight of the orthorhombic titanium-containing composite oxide powder, 5% by weight of artificial graphite having a particle size of 5 μm (D50 value), and 5% by weight of polyvinylidene fluoride (PVdF) to an NMP solution, followed by mixing. Using this slurry, a negative electrode sheet having a thickness of 131 μm was produced, and ten negative electrodes having the same dimensions as those in Example 1 were cut out.

A secondary battery was produced in the same manner as in Example 1 except that these negative electrodes were used.

Comparative Example 1

A positive electrode sheet was prepared in the same procedure as in Example 1. Ten positive electrodes, each having the same dimensions as those of the A size positive electrodes in Example 1, were cut out. When the electrode group was constructed, the ends of the A size positive electrodes were aligned.

A secondary battery was produced in the same manner as in Example 1 except that these positive electrodes were used.

Comparative Example 2

A positive electrode sheet was prepared in the same procedure as in Example 1. Ten positive electrodes, each having the same dimensions as those of the A size positive electrodes in Example 1, were cut out. When the electrode group was constructed, the ends of the A size positive electrodes were aligned.

A secondary battery was produced in the same manner as in Example 7 except that these positive electrodes were used.

Comparative Example 3

A positive electrode sheet was prepared in the same procedure as in Example 1. Ten positive electrodes, each having the same dimensions as those of the A size positive electrodes in Example 1, were cut out. When the electrode group was constructed, the ends of the A size positive electrodes were aligned.

A secondary battery was produced in the same manner as in Example 8 except that these positive electrodes were used.

Evaluation

Each of the secondary batteries obtained in Examples 1 to 6 and Comparative Example 1 was subjected to constant current-constant voltage (CCCV) charge at 2.9 V and 1 A for 5 hours to be put into a fully charged state. Each of the secondary batteries obtained in Examples 7 to 8 and Comparative Examples 2 to 3 was subjected to CCCV charge at 2.7 V and 1 A for 5 hours to be put into a fully charged state.

Each of the charged secondary batteries was placed in a flat-bottomed resin vat, and a stainless steel plate of 600 g was placed on each of the secondary batteries. In this state, the secondary batteries were allowed to stand at 25° C. for 24 hours, and then the voltage of each of the secondary batteries was measured.

The voltage of the secondary battery after being allowed to stand was 2.83 V in Example 1, 2.81 V in Example 2, 2.86 V in Example 3, 2.81 V in Example 4, 2.85 V in Example 5, 2.82 V in Example 6, and 2.73 V in Comparative Example 1.

The voltage of the secondary battery after being allowed to stand was 2.64 V in Example 7, 2.63 V in Example 8, 2.59 V in Comparative Example 2, and 2.57 V in Comparative Example 3.

In the secondary batteries of Example 1 to 6 and Comparative Example 1, the battery voltage before being allowed to stand was 2.9 V. The decreased amount of battery voltage of the secondary battery of Comparative Example 1 from before to after being allowed to stand was greater compared to the decreased amount in the secondary batteries of Example 1 to 6. This shows that the self-discharge amount was greater in Comparative Example 1 as compared to those in Examples 1 to 6.

In the secondary batteries of Examples 7 to 8 and Comparative Examples 2 to 3, the battery voltage before being allowed to stand was 2.7 V. The decreased amount of the battery voltage for each of the secondary batteries of Comparative Examples 2 and 3 from before to after being allowed to stand was greater compared to the decreased amount in the secondary batteries of Examples 7 and 8. This shows that the self-discharge amount was greater in each of Comparative Examples 2 and 3 as compared to those in Examples 7 and 8.

From the comparison between Examples 1 to 8 and Comparative Example 1 to 3, it can be determined that short-circuit resistance had improved in Examples 1 to 8.

According to at least one embodiment and example described above, provided is an electrode group including an electrically insulating layer, a first electrode, and a second electrode. The second electrode is stacked in a first direction on the first electrode with the electrically insulating layer interposed therebetween. The first electrode includes plural first end portions in one or more second directions among directions orthogonal to the first direction. The plural first end portions are disposed at different positions in at least one of the second directions. The electrode group having this configuration can achieve a secondary battery and a battery pack that have excellent short circuit resistance, and a vehicle including the battery pack.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electrode group comprising an electrode stack, the electrode stack comprising:
   an electrically insulating layer comprising insulating particles;
   a first electrode; and
   a second electrode stacked in a first direction on the first electrode with the electrically insulating layer interposed therebetween,
   the first electrode comprising plural first end portions in a second direction orthogonal to the first direction, the first electrode having a first band-shape, a short-side direction of the first band-shape being parallel to the second direction, the first electrode further comprising at least plural first portions and plural second portions alternately arranged along a long-side direction of the first band-shape, a first width of the first portions in the short-side direction being narrower than a second width of the second portions in the short-side direction,
   the second electrode having a second band-shape having a same width in a short-side direction of the second band-shape over an entire span in a long-side direction of the second band-shape, and
   the electrode stack being wound with a winding axis direction being parallel to the second direction to configure a wound electrode structure such that the first electrode comprises plural first laps stacked within the wound electrode structure, where the first portions and second portions are alternately stacked as the plural first laps, whereby the first end portions are disposed at different positions in the second direction.

2. The electrode group according to claim 1, wherein the second electrode is wound such that the second electrode comprises plural second laps stacked within the wound electrode structure, whereby the second electrode comprises plural second end portions in the second direction stacked as the plural second laps, and the second end portions are disposed at positions aligned in the second direction.

3. The electrode group according to claim 1, wherein a displacement width S in the second direction between two first end portions among the first end portions that are adjacent in the first direction is 5×T or more of a thickness T of the first electrode.

4. The electrode group according to claim 1, wherein one of the first electrode and the second electrode comprises at least one selected from the group consisting of lithium titanate represented by $Li_{4+x}Ti_5O_{12}$ for which $0 \leq x \leq 3$, a niobium titanium composite oxide represented by $Li_a TiM_bNb_{2+\beta}O_{7+\delta}$ for which M is at least one selected from the group consisting of Fe, V, Mo, and Ta; and $0 \leq a \leq 5$, $0 \leq b \leq 0.3$, $-0.3 \leq \beta \leq 0.3$, and $-0.3 \leq \delta \leq 0.3$, and an orthorhombic titanium-containing composite oxide represented by $Li_{2+a}M(I)_{2-b}Ti_{6-c}M(II)_dO_{14+\sigma}$ for which M(I) is at least one selected from the group consisting of Sr, Ba, Ca, Mg, Na, Cs, and K; M(II) is at least one selected from the group consisting of Zr, Sn, V, Nb, Ta, Mo, W, Y, Fe, Co, Cr, Mn, and Al; and $0 \leq a \leq 6$, $0 < b < 2$, $0 < c < 6$, $0 < d < 6$, and $-0.5 \leq \sigma \leq 0.5$.

5. The electrode group according to claim 1, wherein the insulating particles comprise at least one selected from the group consisting of alumina and zirconia.

6. The electrode group according to claim 1, wherein the insulating particles comprise particles of an inorganic compound having lithium ion conductivity.

7. The electrode group according to claim 1, wherein the electrically insulating layer comprises a gel electrolyte.

8. A secondary battery comprising:
   the electrode group according to claim 1; and
   a container member housing the electrode group.

9. A battery pack comprising the secondary battery according to claim 8.

10. The battery pack according to claim 9, further comprising:
    an external power distribution terminal; and
    a protective circuit.

11. The battery pack according to claim 9, comprising plural of the secondary battery, the secondary batteries being electrically connected in series, in parallel, or in a combination of in a series and in parallel.

12. A vehicle comprising the battery pack according to claim 9.

13. The vehicle according to claim 12, which comprises a mechanism configured to convert kinetic energy of the vehicle into regenerative energy.

14. An electrode group comprising an electrode stack, the electrode stack comprising:
    an electrically insulating layer comprising insulating particles;
    a first electrode; and
    a second electrode stacked in a first direction on the first electrode with the electrically insulating layer interposed therebetween,
    the first electrode comprising plural first end portions in a second direction orthogonal to the first direction, the first electrode having a first band-shape, a short-side direction of the first band-shape being parallel to the second direction, and the first electrode further comprising three or more regions arranged along a long-side direction of the first band-shape, respective widths of the regions in the short-side direction being different from widths in the short-side direction of adjacent regions along the long-side direction,
    the second electrode having a second band-shape having a same width in a short-side direction of the second band-shape over an entire span in a long-side direction of the second band-shape, and
    the electrode stack being wound with a winding axis direction being parallel to the second direction to configure a wound electrode structure such that the first electrode comprises plural first laps stacked within the wound electrode structure, where lap widths in the second direction are different between two laps adjacent in a stacking direction among the plural first laps, whereby the first end portions are disposed at different positions in the second direction.

15. The electrode group according to claim 1, wherein the first electrode and second electrode do not continuously face each other or repetitively face each other at any of the first end-portions and the second end-portions, in the second direction.

* * * * *